United States Patent [19]

Watanabe et al.

[11] Patent Number: 5,787,377
[45] Date of Patent: Jul. 28, 1998

[54] AIR-BAG CONTROL CIRCUIT

[75] Inventors: Kajiro Watanabe, Tokyo; Kazuyasu Kon, Saitama; Shin-ichiro Tsurushima, Saitama; Satoru Matsumori, Saitama; Yasuo Saito, Saitama; Kunihiro Kaneko, Saitama; Katsushi Ohneda, Saitama, all of Japan

[73] Assignee: Kanto Seiki Co. Ltd., Omiya, Japan

[21] Appl. No.: 311,741

[22] Filed: Sep. 23, 1994

Related U.S. Application Data

[63] Continuation-in-part of Ser. No. 749,459, Aug. 26, 1991, abandoned.

[30] Foreign Application Priority Data

| Aug. 24, 1990 | [JP] | Japan | 2-222858 |
|---|---|---|---|
| Sep. 21, 1990 | [JP] | Japan | 2-253515 |
| Oct. 2, 1990 | [JP] | Japan | 2-264649 |
| Nov. 27, 1990 | [JP] | Japan | 2-324787 |
| Nov. 27, 1990 | [JP] | Japan | 2-324788 |
| Nov. 27, 1990 | [JP] | Japan | 2-324790 |
| Nov. 27, 1990 | [JP] | Japan | 2-324791 |
| Nov. 27, 1990 | [JP] | Japan | 2-324792 |
| Nov. 27, 1990 | [JP] | Japan | 2-324794 |
| Apr. 8, 1991 | [JP] | Japan | 3-101821 |
| Jun. 27, 1991 | [JP] | Japan | 3-57143 U |
| Jul. 22, 1991 | [JP] | Japan | 3-204583 |
| Jul. 22, 1991 | [JP] | Japan | 3-204584 |

[51] Int. Cl.$^6$ ................................ B60R 21/32
[52] U.S. Cl. ............ 701/45; 307/10.1; 340/669; 280/735; 180/268
[58] Field of Search .............. 364/424.05; 307/10.1; 180/268; 280/735; 340/436, 669, 438

[56] References Cited

U.S. PATENT DOCUMENTS

| 4,243,248 | 1/1981 | Scholz et al. | 280/735 |
|---|---|---|---|
| 4,950,914 | 8/1990 | Kurihara et al. | 307/10.1 |
| 4,985,835 | 1/1991 | Sterler et al. | 364/424.05 |
| 5,021,678 | 6/1991 | Diller | 307/10.1 |
| 5,118,134 | 6/1992 | Mattes et al. | 280/735 |

(List continued on next page.)

FOREIGN PATENT DOCUMENTS

| 2 222 038 | 11/1973 | Germany . |
|---|---|---|
| 3 803 426 | 8/1989 | Germany . |
| 3 816 587 | 11/1989 | Germany . |
| 47-37886 | 9/1972 | Japan . |
| 47-36438 | 11/1972 | Japan . |
| 55-32574 | 3/1974 | Japan . |

(List continued on next page.)

OTHER PUBLICATIONS

David Breed et al., Problems in Design and Engineering of Air Bag Systems, 1988 Soiety of Automotive Engineers.
D.H. Sheingold, "Interfaceschaltungen zur Meßwerterfassung", Analog Devices, Inc., (1983), 6 pgs.
Mende/Simon: Physik-Gleichungen und Tabellen, Wilhelm Heyne Verlag, München, 1976 Total of 4 pages.

*Primary Examiner*—Kevin J. Teska
*Assistant Examiner*—Tyrone V. Walker
*Attorney, Agent, or Firm*—Foley & Lardner

[57] ABSTRACT

A control circuit for an air-bag mounted in a motor vehicle comprises an acceleration sensor for producing an acceleration signal indicative of acceleration of the vehicle, an ignition timing circuit for processing the acceleration signal to predict the time when a passenger's head will reach a front surface of the air-bag in fully deployed condition and producing a first air-bag deploying signal in accordance with the predicted time, and a damage discrimination circuit for processing the acceleration signal and judging the need of activation of the air-bag when the cumulative effect of the acceleration exceeds a predetermined limit. The damage discrimination circuit produces a second air-bag deploying signal when judging the need of activation of the air-bag. A so-called AND means is further employed which actually activates the air-bag when receiving the first and second air-bag deploying signals concurrently.

37 Claims, 26 Drawing Sheets

U.S. PATENT DOCUMENTS

| | | | |
|---|---|---|---|
| 5,157,268 | 10/1992 | Spies et al. | 307/10.1 |
| 5,176,214 | 1/1993 | Taufer et al. | 180/268 |
| 5,194,755 | 3/1993 | Rhee et al. | 307/10.1 |
| 5,216,607 | 6/1993 | Diller et al. | 364/424.05 |
| 5,229,943 | 7/1993 | Eigler et al. | 364/424.05 |
| 5,330,226 | 7/1994 | Gentry et al. | 280/735 |
| 5,359,515 | 10/1994 | Weller et al. | 364/424.05 |

FOREIGN PATENT DOCUMENTS

| | | |
|---|---|---|
| 49-55031 | 5/1974 | Japan. |
| 50-14772 | 5/1975 | Japan. |
| 59-8574 | 2/1984 | Japan. |
| 63-275959 | 11/1988 | Japan. |
| 63-503531 | 12/1988 | Japan. |
| 2-18134 | 1/1990 | Japan. |
| 2-38161 | 2/1990 | Japan. |
| 4-503339 | 8/1990 | Japan. |
| 3-253441 | 11/1991 | Japan. |
| 4-1061 | 1/1992 | Japan. |
| WO 90/11207 | 3/1989 | WIPO. |

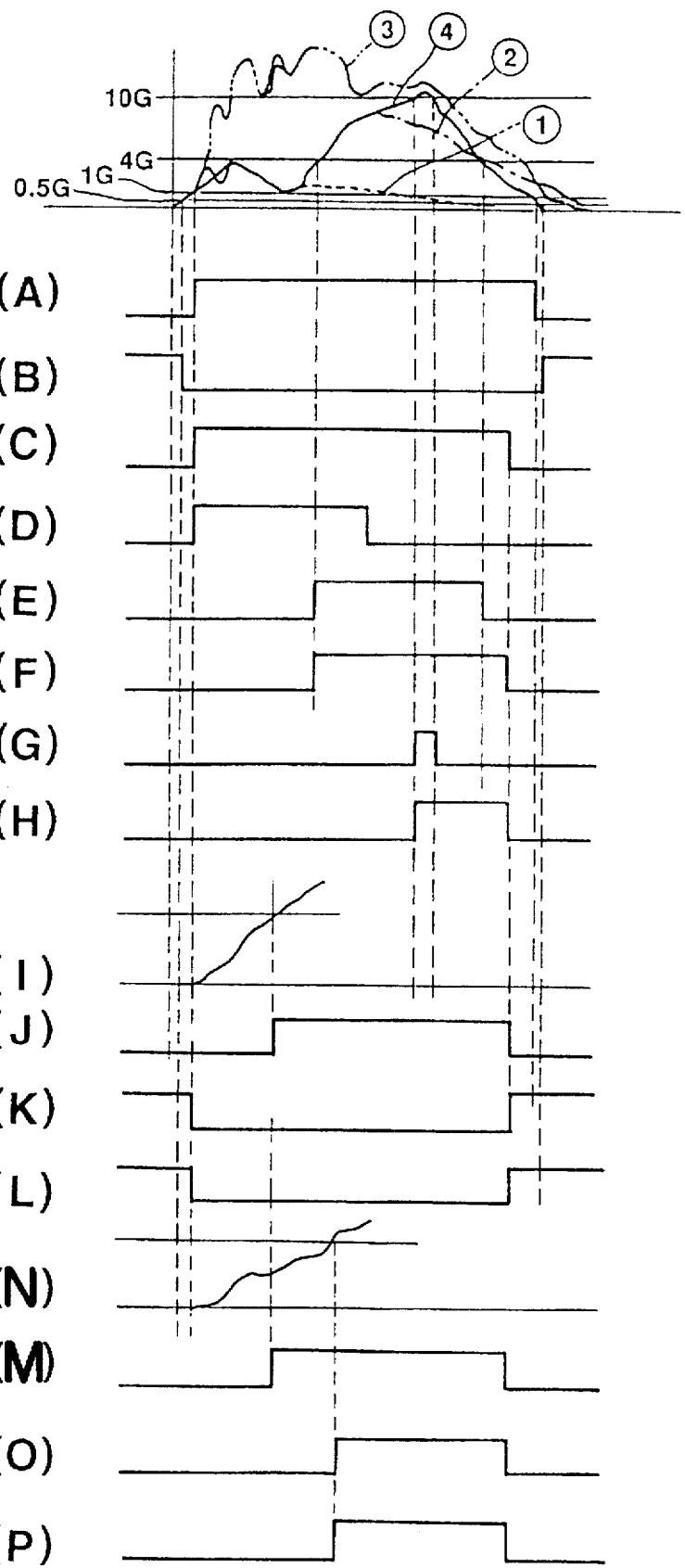

FIG.17A

| | 1 | 2 | 3 | 4 | 5 | 6 | 7 |
|---|---|---|---|---|---|---|---|
| | ← LARGE | | | | | SMALL → | |
| A | 1 | 0 | 1 | 0 | 1 | 0 | 1 |
| B | 0 | 1 | 1 | 0 | 0 | 1 | 1 |
| C | 0 | 0 | 0 | 1 | 1 | 1 | 1 |
| R | $4R_2$ | $2R_2$ | $\frac{4}{3}R_2$ | $R_2$ | $\frac{4}{5}R_2$ | $\frac{2}{3}R_2$ | $\frac{4}{7}R_2$ |

FIG.17B

| | 1 | 2 | 3 | 4 | 5 | 6 | 7 |
|---|---|---|---|---|---|---|---|
| | ← FORWARD | | | | | REAR → | |
| A | 1 | 0 | 1 | 0 | 1 | 0 | 1 |
| B | 0 | 1 | 1 | 0 | 0 | 1 | 1 |
| C | 0 | 0 | 0 | 1 | 1 | 1 | 1 |
| R | $4R_2$ | $2R_2$ | $\frac{4}{3}R_2$ | $R_2$ | $\frac{4}{5}R_2$ | $\frac{2}{3}R_2$ | $\frac{4}{7}R_2$ |

AIR-BAG CONTROL CIRCUIT

This is a continuation-in-part application of Ser. No. 07/749,459 filed Aug. 26, 1991 now abandoned.

BACKGROUND OF THE INVENTION

1. Field of the Invention

The present invention relates to accelerometer (G sensor) responsive control circuits which are used to control the operation of devices such as those disposed in automotive vehicles and the like, and more specifically to such types of control circuits which require an accurate prediction of the displacement of an object under the influence of the acceleration in order to effectively implement operation. More specifically, the present invention is concerned with air-bag inflator ignition timing control circuits of a type which predict a displacement of a driver's head by processing an acceleration (or deceleration) of the vehicle and determine the ignition timing of the air-bag inflator in accordance with predicted displacement of the driver's head.

2. Description of the Prior Art

Currently, there is a demand to improve the control of the vehicular related systems with a view of improving occupant safety. One aspect of these endeavors comes in the provision of passenger restraint systems which are designed to improve passenger safety during collisions and like types of accidents.

One type of restraint system takes the form of an inflatable cushioning arrangement generally referred to as an "air-bag". However, air-bags are such as require a finite time to reach maximum inflation and then quickly deflate. Accordingly, it is very difficult to time the detonation of a gas producing charge or the opening of a valve via which compressed gas is released, in order to inflate the bag in a manner which optimizes the cushioning effect of the same. That is to say, in the case of an air bag which is arranged to protect a driver from impact with the vehicle steering wheel, if the inflation is induced too late the inflation degree will be less than optimal at the time the person actually comes into contact with the air bag. This of course increases the chances of injury as a result of impacting on the steering wheel rim or hub. On the other hand, if the timing is too early, the bag will be in the process of deflating when the driver comes into contact with the air bag. This again reduces the cushioning effect of the air bag.

A number of control circuits have been proposed for use with G sensors for timing the detonation of an air-bag inflating charge and/or control of the like type of passenger restraint devices.

One such control circuit is disclosed in U.S. Pat. No. 4,985,835 granted Jan. 15, 1991. This patent discloses a method of determining the time when an automotive safety system, such as an air-bag or the like, should be released or activated. That is, in this method, the displacement of a driver from the seated position at a predetermined time in the future is calculated and predicted based on signals issued from an acceleration sensor, and the safety system (viz., air-bag) is activated when the predicted displacement of the driver exceeds a predetermined threshold value. For the prediction of the driver's displacement, the following formula is used:

$$SI(tx+Z)=K1 SI(tx)+K2 \cdot Vrel(tx) \cdot Z+K3 \cdot a(tx)Z^2/2+K4 \cdot da(tx)/dt \cdot Z^3/3 \quad (1)$$

wherein:

tx=time x
Z=activation time of the safety device
a(t)=acceleration sensor signal at time t
Vrel=relative velocity, calculated by integration of a(t)
SI(t)=projected position of the passenger at time t (calculated by doubled integration of the acceleration sensor signal)
K1 to K4=evaluation factors As seen, in the formula, the acceleration signal is subjected to double integration, integration and differentiation for prediction of the driver's displacement upon a vehicle collision. In fact, the formula is provided on the assumption that upon a vehicle collision, the driver would act as a freely movable mass in relation to the vehicle.

SUMMARY OF THE INVENTION

As will be described in detail hereinafter, according to the present invention, a unique formula is used for predicting the displacement of a driver (more specifically, a head of the driver) upon a vehicle collision. However, for the following reason, the formula used in the present invention has no acceleration differential term added thereto, unlike the formula of the above-mentioned '835 Patent.

The formula taught in the '835 patent would be accurate if the acceleration signal used is provided by an acceleration sensor mounted to the driver's head. However, in practice, the acceleration signal used for the head displacement prediction is provided by an acceleration sensor mounted in the vehicle. This means that the acceleration signal produced upon the vehicle collision contains, in addition to a signal component really needed for the displacement prediction, another signal component (or noise) which has a bad influence upon the prediction. Thus, in order to overcome the defects of the '835 patent, the present invention does not utilize an acceleration differential term, and the resulting formula has been found much practical as a result of routine simulations and actual crash tests. In addition, the formula has been prepared on the assumption that upon vehicle collision the driver's head would be moved forward in a relatively simple manner, that is, the driver's head would be moved forward at a constant acceleration because the upper half of the driver who sits on the seat is not rigid but flexible in construction. The meaning of the constant acceleration will be clearly decribeed hereinafter, particularly, in pages 27 and 28.

In the present invention, a so-called timing circuit is employed which carries out the prediction of the head displacement by using the unique formula and issues a first signal at the time appropriate for the air-bag to reliably and assuredly protect the driver's head. In addition to the prediction of the head displacement, a damage discrimination is also carried out by a so-called damage discrimination circuit which judges whether or not the vehicle collision is of the nature which needs the inflation of the air-bag. That is, when judging the need of the inflation of the air-bag, the damage discrimination circuit issues a second signal. An AND circuit is employed which actually activates the air-bag (viz., ignites the air-bag inflator) when receiving the first and second signals concurrently.

It is therefore an object of the present invention to provide an air-bag control circuit which comprises generally an ignition timing circuit which determines the best time for igniting the airbag inflator to allow the air-bag to appropriately protect a driver's head, a damage discrimination circuit which judges whether or not the air-bag inflator should be ignited and a logic circuit which actually ignites the air-bag inflator only when the ignition timing circuit determines the best time and the damage discrimination circuit judges the need of ignition of the air-bag inflator.

It is another object of the present invention to provide an air-bag control circuit which, to determine the best time for igniting the air-bag inflator, predicts the displacement of a driver's head by processing the acceleration signal using a unique formula.

It is a still another object of the present invention to provide an air-bag control circuit which, for predicting the displacement of a driver's head upon a vehicle collision, includes a calculating circuit which is operatively connected to an acceleration sensor on a motor vehicle for:

integrating an acceleration signal a(t) from the sensor and producing a signal V(t) indicative of velocity;

integrating the velocity indicative signal V(t) to produce a first signal x(t) indicative of displacement;

weighting the acceleration indicative signal a(t) with a factor $t^2 d/2$ to produce a second signal $\{½ \times a(t) \times t^2 d\}$ indicative of displacement;

weighting the velocity indicative signal V(t) with a time factor (td) to produce a third signal $\{V(t) \times td\}$ indicative of displacement;

adding the first, second and third displacement signals together to derive a total displacement signal $\{x(t+td)\}$;

comparing the total displacement signal with a reference value; and issuing the first air-bag deploying signal in the event that the total displacement signal exceeds the reference value.

It is a further object of the present invention to provide an air-bag control circuit which determines the igniting timing of the air-bag inflator by considering the time period needed for fully expanding the air-bag upon the inflator ignition as well as the predicted displacement of the driver's head.

It is a further object of the present invention to provide an air-bag control circuit which comprises an ignition timing circuit which becomes reset in accordance with an output signal issued from a G-level discrimination circuit.

It is a further object of the present invention to provide an air-bag control circuit which comprises a damage discrimination circuit which can judge a so-called soft collision by integrating collision energy by processing the signals continuously issued from an acceleration sensor mounted on the vehicle.

It is a further object of the present invention to provide an air-bag control circuit which has a damage discrimination circuit which comprises a bandpass filter to which output signal from the acceleration sensor is fed and a collision energy calculating circuit to which the output from the bandpass filter is fed.

It is a further object of the present invention to provide an air-bag control circuit which comprises generally an ignition timing circuit which determines the best time for igniting the air-bag inflator to allow the air-bag to appropriately protect a driver's head, and a G-level discrimination circuit which can reset the ignition timing circuit in accordance with the G-level sensed by said acceleration sensor.

It is a further object of the present invention to provide an air-bag control circuit which comprises generally an ignition timing circuit which determines the best time for igniting the air-bag inflator to allow the air-bag to appropriately protect a driver's head, a damage discrimination circuit which judges whether or not the air-bag inflator should be ignited, a logic circuit which causes the ignition of the air-bag inflator only when the ignition timing circuit determines the best time and the damage discrimination circuit judges the need of the ignition of the air-bag inflator, and a G-level discrimination circuit which can reset the ignition timing circuit in accordance with the G-level sensed by said acceleration sensor.

BRIEF DESCRIPTION OF THE DRAWINGS

Other objects and advantages of the present invention will become apparent from the following description when taken in conjunction with the accompanying drawings, in which:

FIG. 2A–2P is a timing chart which depicts an example of the operation of the circuit arrangement shown in FIG. 1;

FIGS. 17A and 17B are charts which show examples of how the resistances used in the circuit arrangement shown in FIG. 16 are varied with respect to seat position and seat back inclination angle in order to modify the air-bag deployment timing;

DETAILED DESCRIPTION OF THE PREFERRED EMBODIMENTS

Figure 1:
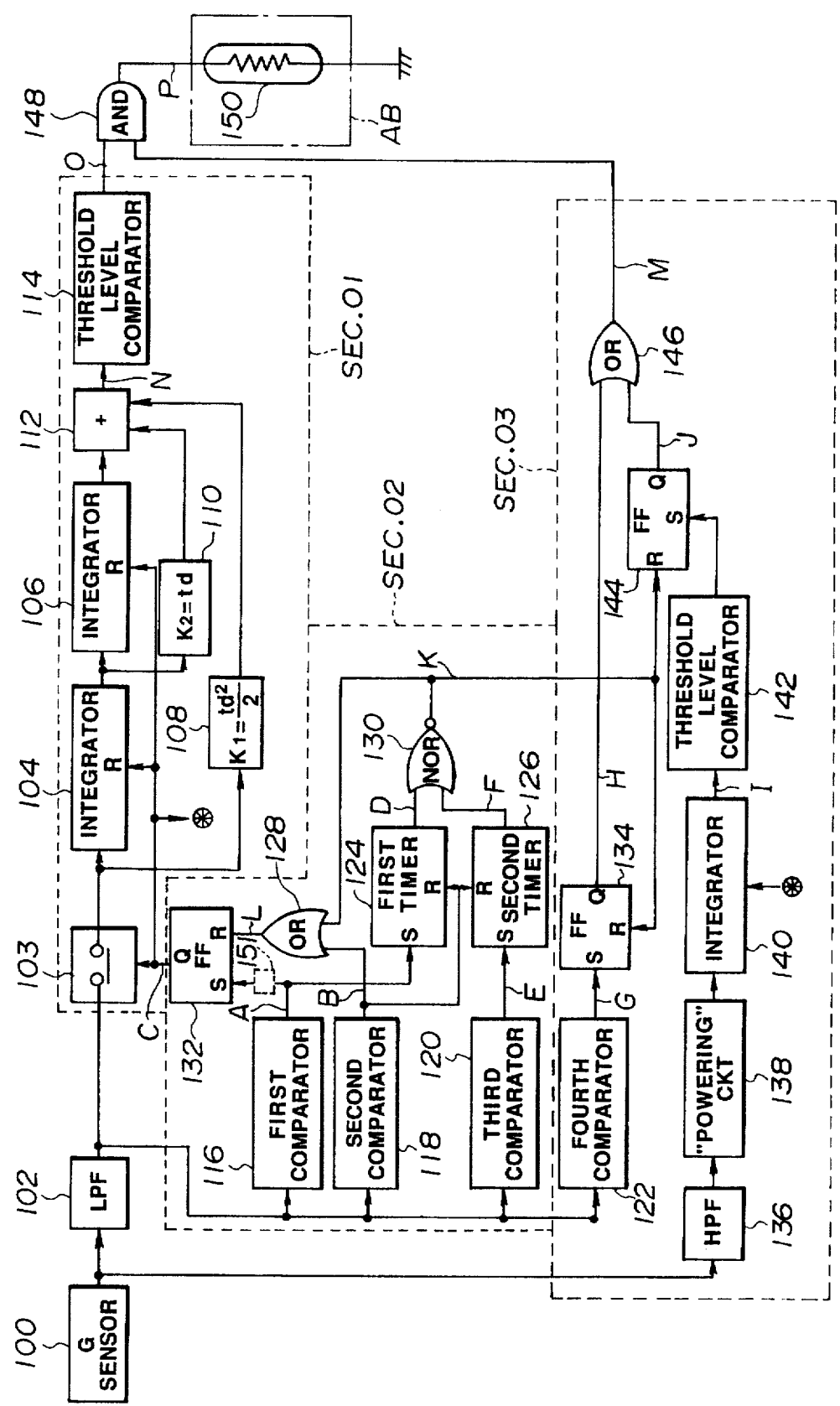
FIG. 1 shows in block diagram form, the arrangement which characterizes a first embodiment of the present invention.
Figure 3A:
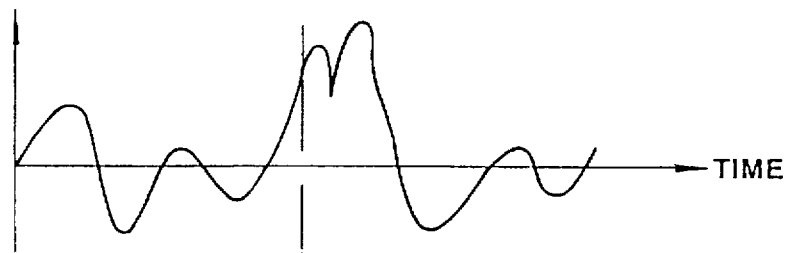
FIG. 3A–3E is a timing chart highlighting the operation of the section of the circuit shown in FIG. 1 which ascertains the nature of the collision and enables the control timing to be determined in accordance therewith.
Figure 3B:
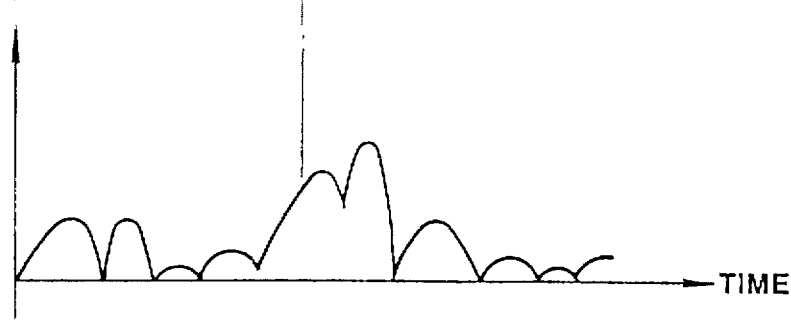
Figure 3C:
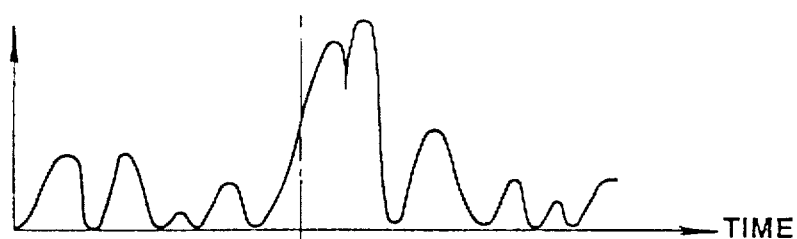
Figure 3D:
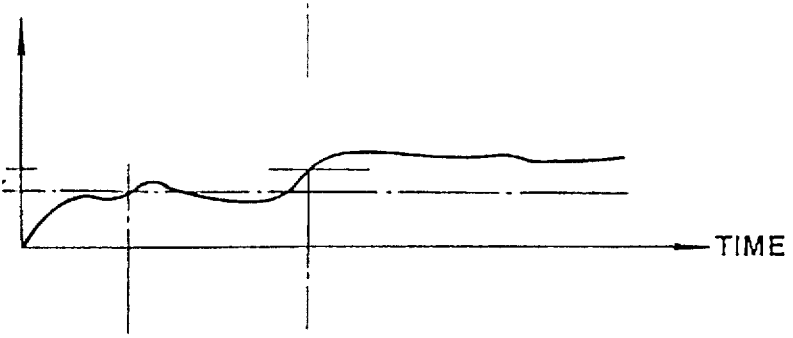
Figure 3E:
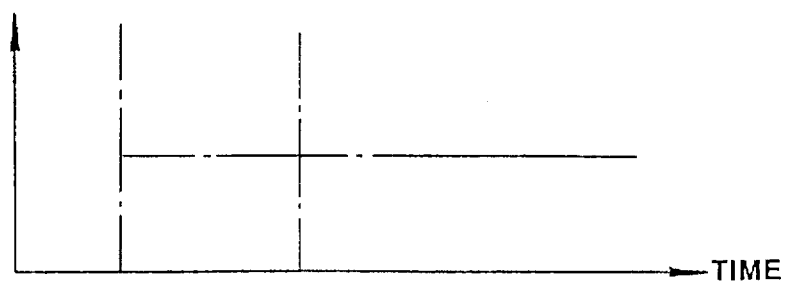

FIG. 1 shows the first embodiment of the present invention in block diagram form. In this system an accelerometer or G sensor unit 100 is arranged to supply its output to a low pass filter (LPF) 102.

The output of the LPF 102 is supplied to a first "displacement prediction" section SEC.01 of the system. This section comprises an ON/OFF type switch 103 and first and second serially connected partial integrators 104 and 106. The output terminal of the switch 103 is also connected with a first coefficient circuit 108. A second coefficient circuit 110 is arranged to receive an input from a junction defined between the first and second integrators 104, 106. The outputs of the second integrator 106 and the first and second coefficient circuits 108, 110 are supplied to an adder circuit 112. A threshold level type comparator or slice level switch 114 is arranged to receive the output (N) of the adder 112 and to output a signal (O) upon a predetermined slice level being exceeded.

A second "G level" discrimination section SEC.02 of the system comprises first, second, third and fourth comparators 116, 118, 120 & 122 which are arranged in parallel and coupled so as to receive the output of the LPF on their respective inputs. The second section further comprises first and second timer circuits 124, 126, an OR gate 128, a NOR gate 130 and first and second multivibrator or flip flop circuits 132, 134, coupled in the illustrated manner.

In this instance the first comparator 116 is arranged to compare the filtered output of the G sensor unit and determine if the voltage level is indicative of a force in excess of 1.0 G. The output (A) of the first comparator 116 is connected with the set terminal (S) of the first flip flop 132 and to the set terminal (S) of the first timer 124. The first timer 124 is arranged to respond to the presence of a high level signal on its set terminal in a manner to be triggered to generate a high level signal (D) on its output for 70 ms (for example).

The second comparator 118 is arranged to compare the filtered signal from the G sensor unit and determine if the voltage is indicative of an acceleration of more than 0.5 G. This comparator 118, as different from the first one, is arranged to normally output a high level signal (B) and switch a low level one in the event that the 0.5 level is exceeded. The output (B) of the second comparator 118 is supplied to the reset terminals (R) of both the first and second timer circuits 124, 126 and to one of the two input terminals of the OR gate 128. The output (L) of the OR gate 128 is connected with reset terminal (R) of the first flip flop circuit 132.

The outputs (D, F) of the first and second timers 124, 126 are supplied to the NOR gate 130. The output (K) of the NOR 130 is supplied to the second of the input terminals of the OR 128. The set terminal (S) of the second timer 126 is arranged to receive the output (E) of the third comparator 120. In this case the comparator 120 is arranged to produce a high level output signal in the event that the output of the G sensor unit should indicate that the instant acceleration has reached or exceeded a 4.0 G magnitude.

The fourth comparator 122 is arranged to produce a high level in the event that the output of the G sensor unit is indicative of a 10.0 G magnitude acceleration. The output (G) of the fourth comparator 122 is supplied to the set terminal of the second flip flop circuit 134.

It will be noted that above 0.5, 1.0, 4.0 and 10.0 G comparator settings are not fixed and can be changed to other values as required.

A third so called "damage discrimination" section SEC.03 of the system comprises: a band pass filter (BPF) 136, an absolute value circuit 138, an integrator 140 and a threshold level comparator or slice level switch 142, all of which are connected in series. The output of the G sensor unit 100 is supplied to the input of the band pass filter (BPF) 136, while the output of the slice level switch 142 is supplied to the set terminal (R) of the flip flop 144.

An OR gate 146 is connected to the output (Q) terminals of the flip flops 134, 144 while the reset terminals (R) of the same are connected with the NOR gate 130 to receive the output (K) therefrom.

The outputs of the slice level switch 114 and the OR gate 146 are supplied to the input terminals of an AND gate 148. The output (P) of the AND 148 is supplied with an ignition device 150 used to induce the inflation of an air-bag device AB.

In this system, the output (C) of the first flip flop circuit 132 of the second section SEC.02 is used to open and close the switch 103 and is also applied as a reset for the three integrators 104, 106 and 140.

It will be noted that it is within the scope of the present invention to connect the first comparator 116 to the flip flop 132 by way of a delay circuit 151. The reason for this provision is to ensure that the flip flop 132 will be set after a reset has been carried out and remove the chance of the two occurring at the same time or even in the wrong order, as might be apt to occur in the case of very rapid deceleration.

OPERATION

The operation of the above described system is such that when the vehicle is running normally along a road, signal C which is output by the flip flop 132, assumes a low level and switch 103 remains open (OFF) and the three integrators 104, 106 and 140 assume reset conditions. Under these conditions, in the event there is a collision, the output of the G sensor unit 100 increases. It will be noted that the upper chart of FIG. 2 is such as include traces (1, 2, 3, 4) which depict four different examples of collisions and the corresponding G force signatures.

Assume at this time that the output characteristics of the G sensor unit follow trace 1 (viz., characteristics wherein the G force exceeds the 1.0 G level and then tapers off in a manner so as to not exceed the 4.0 G level). Under these conditions, as the G value exceeds the 0.5 level the output (B) of the second comparator 118 switches from a high level to a low one (see corresponding trace B in FIG. 2). This removes the signal which is constantly being applied to the reset terminals of the timers 124 and 126 and thus enables counting to be initiated. At this time the output (K) of the NOR gate 130 remains at a high level due to the outputs (D, F) of the two counters 124 and 126 remaining at low levels. Thus, even though signal (B) which is applied to the OR gate 128 has assumed a low level the presence of high level signal (K) ensures that the flip flop circuit 132 remains in a reset state and thus holds the level of signal (C) applied to the switch 103 at a low level. Thus, the switch 103 remains open and the integrators are conditioned to assume a reset state.

Upon the output of the G sensor unit 100 exceeding the 1.0 G level, the output (A) of the first comparator 116 changes to a high level. This sets the flip flop 132 and first counter 124. At this time, as the output (D) of timer 124 assumes a high level, the outputs (K, L) of the NOR 130 and OR 128 change to low levels. The high level signal (A) being applied to the set (S) terminal of the first flip flop 132 causes the output (C) thereof to assume a high level. This closes switch 103 and enables the integrators 104, 106 and 140.

Under these conditions the displacement section SEC.01 is enabled and the first integrator 104 converts the acceleration indicative signal into one indicative of velocity. Subsequently, the second integrator 106 converts the velocity signal into one indicative of displacement. At the same time the acceleration signal is processed in the first coefficient circuit 108 and converted into a signal indicative of displacement. The second coefficient 110 circuit modifies the velocity signal in a manner which also converts the same into a displacement indicative thereof.

The three displacement signals which are produced by the second integration circuit 106 and the first and second coefficient circuits 108 & 110, are supplied to the adder 112 which derives a signal indicative of the total displacement. This total displacement value is then supplied to the slice level switch circuit 114.

Further detailed description of the concept and operation of this section of the system will be made later in connection with FIGS. 9 to 11 which show fifth and sixth embodiments of the instant invention.

The signal from the G sensor unit is filtered by the BPF filter 136 and supplied in the form of signal a ( see trace (a) of the FIG. 3 timing chart) to the absolute value circuit 138 wherein the signal is rectified so as to have only a positive value. It will be noted that this rectification can be executed to achieve either of the wave forms depicted in traces (b') and (b) of FIG. 3. Viz., in the event of direct rectification the resulting signal exhibits the wave form depicted in trace (b').

Next, the rectified signal is supplied to the third integrator 140. It will be noted that the integrator 140 is arranged, along with the integrators 104 and 106, to be reset by the signal C assuming a low level (rendered active by the high level of signal C). Alternatively, an inverter may be inserted between the output of the flip flop 132 and the reset terminals of the just mentioned integrators.

In the event that the integrated value exceeds the slice level of the slice level switch 142, the output (signal r) assumes a high level and sets the flip flop 144.

Setting of the flip flop 144 of course induces the output (M) of the OR gate 146 thereof to assume a high level. When both of the outputs (O, M) of the slice level switch 114 and the OR gate assume high levels, the AND gate 148 opens and the air-bag inflation charge is ignited.

It will be noted that in the event that the G force is determined to not exceed the 4.0 G level, the deployment of the air-bag is controlled by the first and third sections SEC.01 and SEC.03 of the system. That is to say, in the event that the level of deceleration which is induced by the collision does not exceed 4.0 G level the output of the third comparator 120 remains at a low level and the second timer 126 is not triggered.

It should be noted that the two timers 124, 126 are arranged so that the timing periods will overlap in the case of a collision of the nature wherein the vehicle has hit a pole or the like which is causing localized damage to the vehicle (viz., is "cutting" through the softer less rigid panels/ structure of the vehicle body) and has not yet reached rigid structure (e.g. the engine/transmission, cabin bulkhead etc.,) and life endangering deceleration has not yet been produced.

Thus, in the case wherein the collision is such that the G force which is produced follows trace 1 the second counter will not be triggered. On the other hand, if the characteristics of the collision are such that the deceleration produced follows trace 4, at the time the G force exceeds the 4.0G level, the operational events of the example depicted in the timing chart of FIG. 2 will occur. Viz., as shown, signals E and F output by the third comparator 120 and the second timer 126 assume high levels. This is such as to maintain the output of the NOR gate 130 at a low level past the point in time the output (D) of the first timer drops back to a low level.

In this particular example, slightly before the point in time the G force exceeds 4.0 G the output (I) of the integrator 140 exceeds the slice level of slice level switch 142 and has induced the output (J) of the flip flop 144 to assume a high level and thus cause the level of the OR gate 146 output (M) to go to a high level. Thus, at the time the output (N) of the adder 112 exceeds the slice level of the switch circuit 114, the AND gate 148 induces the inflation of the air-bag AB.

It will be noted that at any time a G force of 10.0 G or more, is sensed by the G sensor unit 100, the output (G) of the fourth comparator 122 goes to high level and sets the flip flop 134. The flip flop 134 output remains at the high level until such time as the output (K) of the NOR gate 130 returns to a high level and resets the same. Thus, even though the G force level may remain above the 10.0 G level for only a very short time, the flip flop 134 will be set and until both of the first and second timers 124, 126 have finished producing high level signals, the level of the OR gate output (M) will be assuredly held at a high level. This by-passes and/or supplements the operation of the third section SEC.03 of the system and provides a high level input (M) to the AND gate 148.

As will be appreciated from trace (I) of FIG. 3, by setting the slice level Vt with which the output of the third integrator 140 is compared, it is possible to induce the r signal to assume a high level at the timing indicated in solid line, or lower the level to Vt' for example, and cause the r signal to assume a high level at the timing indicated by the one dot phantom line.

The setting of this slice level is of course made in accordance with the type of vehicle and the structure of the same.

Although the above and subsequent embodiments are described as taking the form of an analog circuit arrangement, it will be understood that they can be implemented using appropriate software/programs in a microprocessor. In fact the use of a microprocessor facilitates the minor changes in settings which are required in order to adapt the same circuit to a number of different vehicles and facilitate the data input from various sensors such as those used in passenger seat positions and the like.

It should be further noted that the band pass filter (BPF) 136 can be replaced with suitable low or high band pass filters without substantially altering the operation of the arrangement.

Second Embodiment

Figure 4:
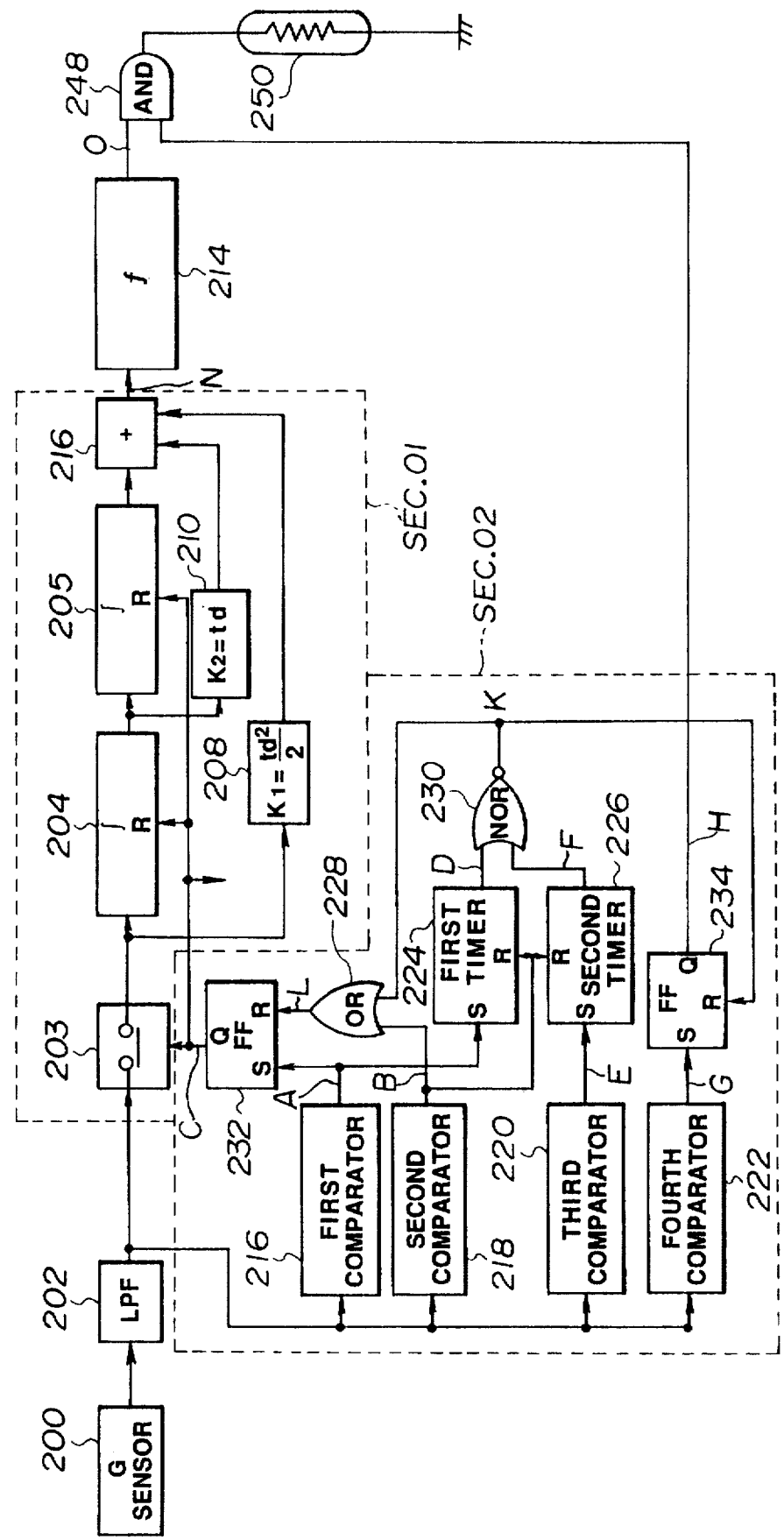
FIG. 4 is a schematic block diagram showing a second embodiment of the present invention.

FIG. 4 shows a second embodiment of the present invention. Note in this and each subsequent embodiment, the first digit of each of the numerals is incremented in accordance with the embodiment number As will be apparent, this arrangement is basically the same as the first one and differs in the omission of the third damage discrimination section SEC.03. In this arrangement the output of the flip flop 234 is supplied directly to the AND gate 248.

Third Embodiment

Figure 5:
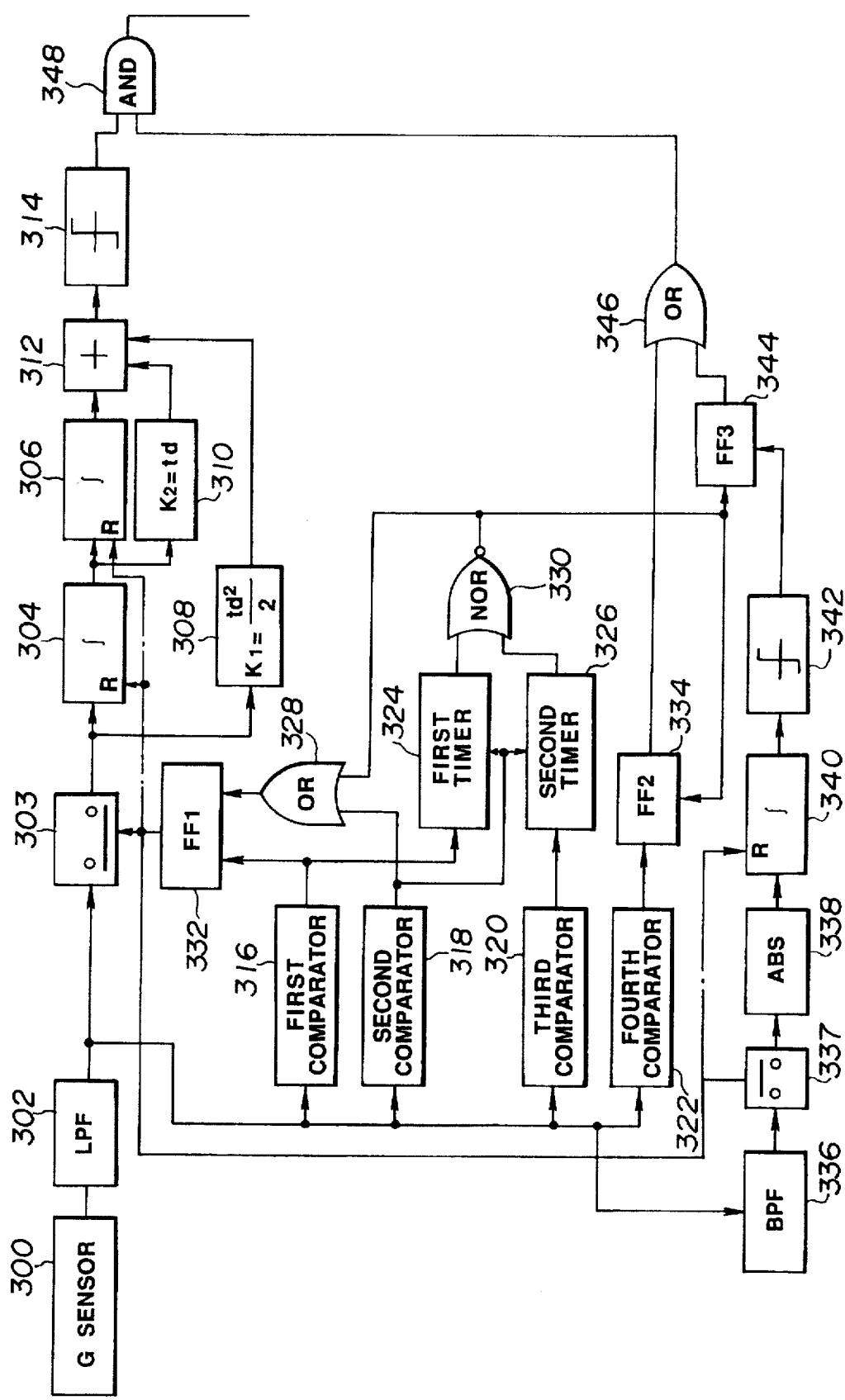
FIGS. 5 and 6 are schematic block diagrams showing third and fourth embodiments of the present invention.

FIG. 5 shows a third embodiment of the present invention. The system which is illustrated in this drawing is basically similar to the first one disclosed in connection with FIGS. 1 to 3. This arrangement basically differs from the one shown in FIG. 1 in that the BPF 436 is circuited with the absolute value circuit 338 via a switch 337. This switch 337 is operatively connected with the output of the flip flop 332 so as to be closed simultaneously with the switch 303 in response to a deceleration in excess of 1.0 G. Viz., in response to the first comparator 316 producing a high level signal and setting the flip flop 332 and first timer 324.

Fourth Embodiment

Figure 6:
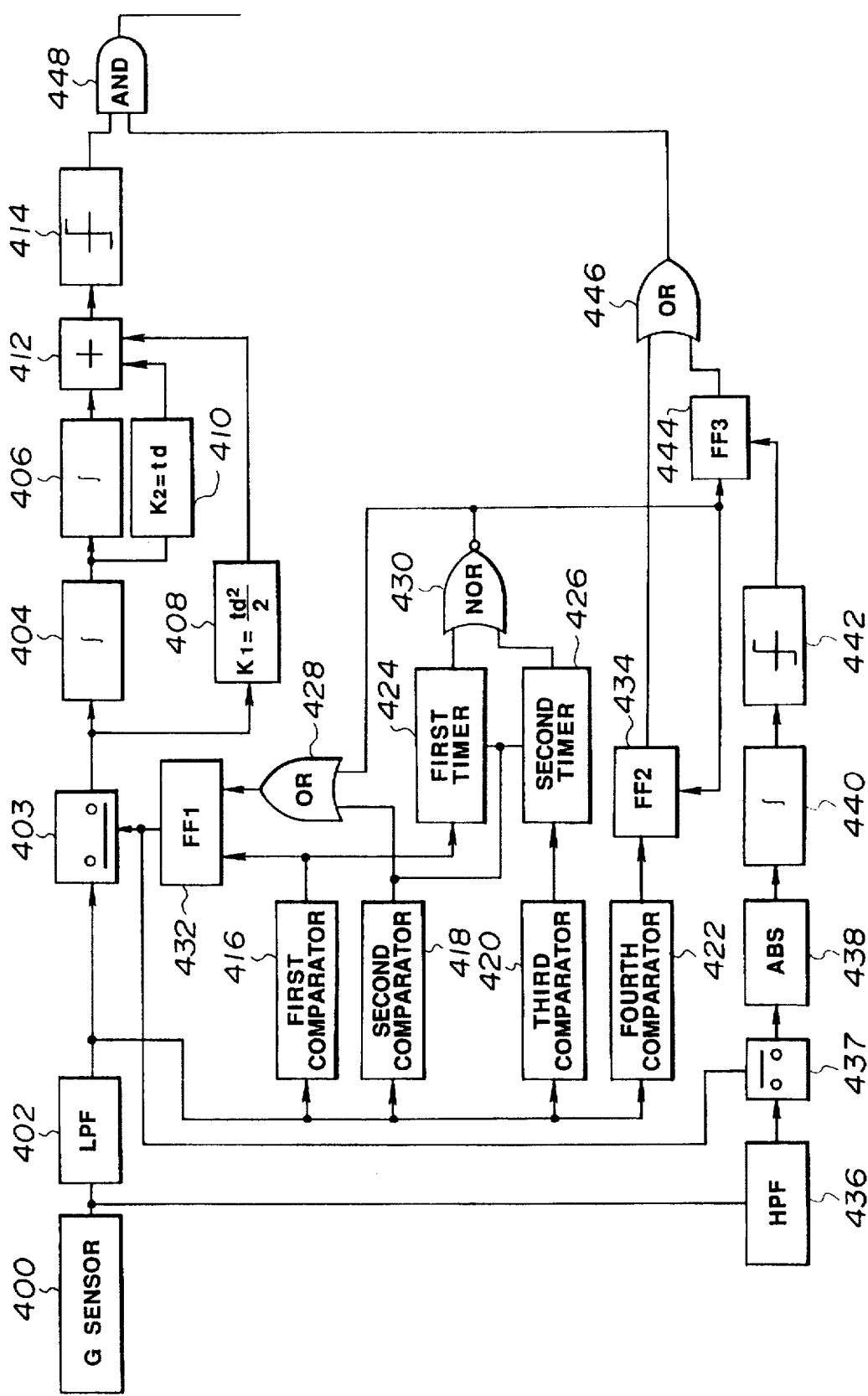

FIG. 6 shows a fourth embodiment of the present invention. The system which is illustrated in this drawing is also basically similar to the first one disclosed in connection with FIGS. 1 to 3. This arrangement basically differs from the one shown in FIG. 1 in that the output of the G-sensor 400 is supplied to a HPF (high pass filter) 436 and in that the HPF 436 is circuited with the absolute value circuit 438 via a switch 437. As in the case of the third embodiment, the switch 437 is operatively connected with the output of the flip flop 432 so as to be closed simultaneously with the switch 403 in response to a deceleration in excess of 1.0 G. Viz., in response to the first comparator 416 producing a high level signal and setting the flip flop 432 and first timer 424.

Although not shown, it will be understood that suitable reset signals are applied to the integrators to keep them in a reset and "ready to go" state until such time as the switches 403 and 437 are closed. The manner in which the reset can be achieved will be fully within the grasp of one skilled in the instant art and as such no further disclosure will be given.

Fifth Embodiment

Figure 7:
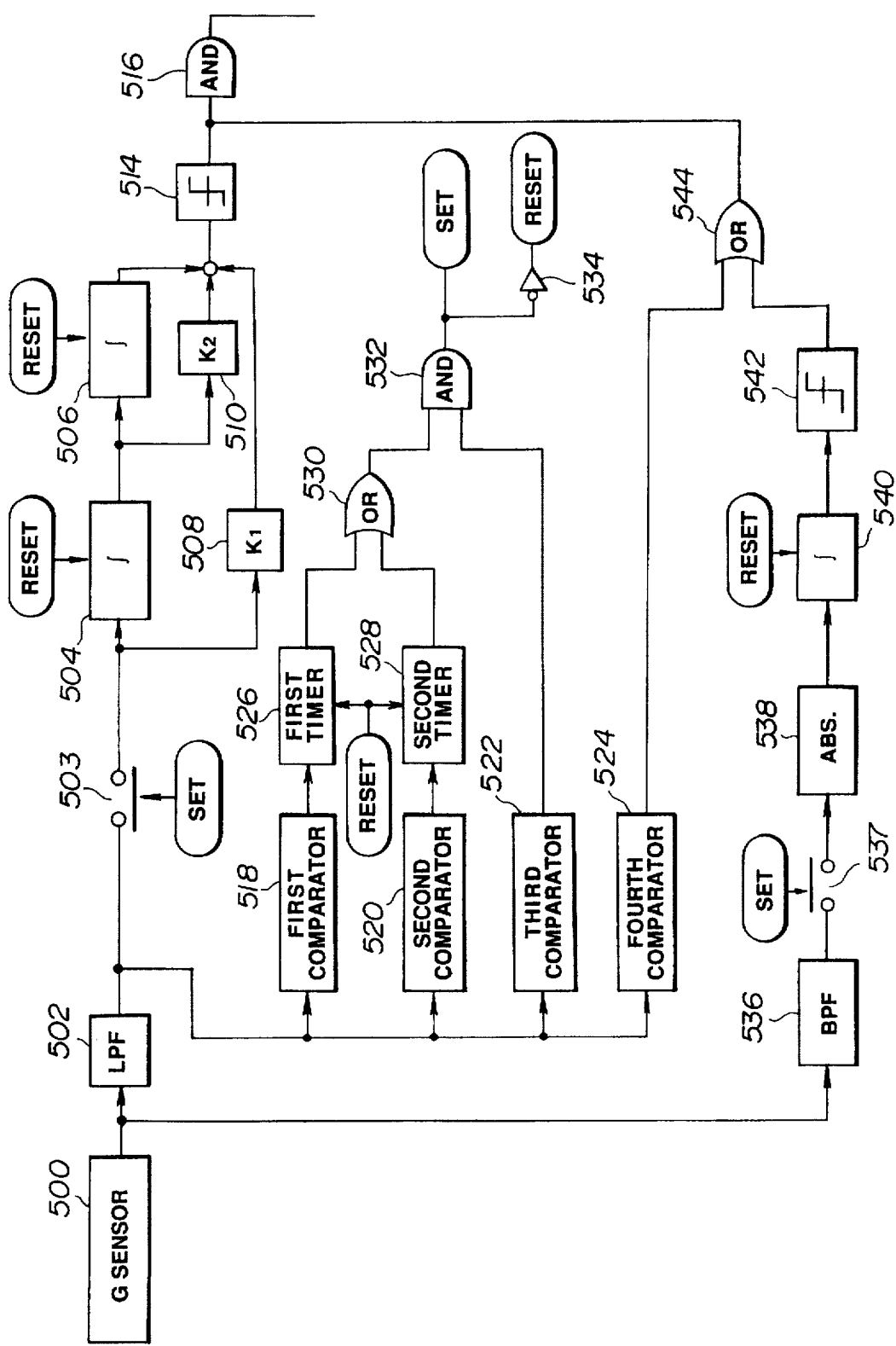
FIG. 7 is a block diagram showing the arrangement which characterizes a fifth embodiment of the present invention.

FIG. 7 shows a circuit arrangement which characterizes a fifth embodiment of the present invention. In this circuit arrangement, a G sensor unit 500 is arranged to supply its output to a LPF low pass filter 502. The low pass filter 502 is coupled via a switch 503 with first and second serially connected integrators 504 and 506. The switch 503 is also coupled with the input terminal of a first coefficient circuit 508. A second coefficient circuit 510 has its input terminal connected to a junction defined between the first and second integrators 504, 506. The outputs of the second integrator 506, and the first and second coefficient circuits 508, 510 are connected by way of an adder 512 to a slice level switch (threshold type comparator) 514. The output of the slice level switch 514 is connected to the first of the two inputs of an AND gate 516.

First, second, third and fourth comparators 518, 520, 522 and 524 are arranged in parallel and have their input terminals coupled to the output of the low pass filter LPF 502. In this instance the comparators are set to output high level signals in response to G sensor unit 500 indicating a deceleration of 1.0 G, 4.0 G, 0.5 G and 10 G, respectively.

The first and second comparators 518 and 520 are coupled with the set terminals of first and second timers 526 and 528, respectively. The outputs of the timers are connected by way of an OR gate 530 with one of the inputs of an AND gate 532. The other of the AND gate inputs is connected with the output of the third comparator 522.

The output of the AND gate 532 is supplied directly to SET terminals. An inverter 534 is arranged to invert the output of the AND gate 532 and supply an inverted signal to RESET terminals.

The output of the G sensor unit 500 is also supplied to a BPF band pass filter 536 and via serially connected ON/OFF switch 537, absolute value circuit 538, integrator 540 and slice level switch 542, to an OR gate 544.

As will be noted, the output of the fourth comparator 524 is connected by way of the OR gate 544 with the second input of the AND gate 516.

A will be appreciated, the operation of this arrangement is going to be basically similar to the one shown in FIG. 1 while providing the feature wherein any possible error in setting and resetting of the various circuits is going to be positively eliminated in that, while the output of the AND gate 532 assumes a high level, the level of the SET signal will be high and the level of the REST signal will definitely be the opposite (i. e. low).

It will be noted however, the output of third comparator 522 in this instance, is arranged to change from low to high upon a G force equal to or greater than 0.5 being sensed by the sensor 500.

The operation of this circuit is such that upon the occurrence of a collision and the G force produced by the same exceeding 0.5 G, the output of the third comparator is supplied to the AND gate 532. Upon the level increasing to 1.0 G the first timer 526 is triggered and level of the OR gate 530 is raised to a high level opening the AND gate 532. This issues a SET signal which closes switches 503 and 537. At the same time, the RESET signals are inverted to low level and the integrators 504, 506 and 540 begin integrating the signals input thereto.

By suitably setting the slice level of the slice level switch 542, to allow for the instant type of vehicle, in the case that sufficient vehicular damage is indicated as having occurred, the output of the OR gate 544 will go to a high level before the prediction circuit section indicates that the air-bag inflation charge should be fired in order to achieve the required air-bag deployment and provide the optimal cushioning effect. On the other hand, if the deceleration level rises to, or exceeds the 10.0 G level, a signal is immediately applied to the AND gate 516 as the deployment of the air-bag is imperative and the need to determine the extent to which the vehicle damage has proceeded, is negated.

Sixth Embodiment

Figure 8:
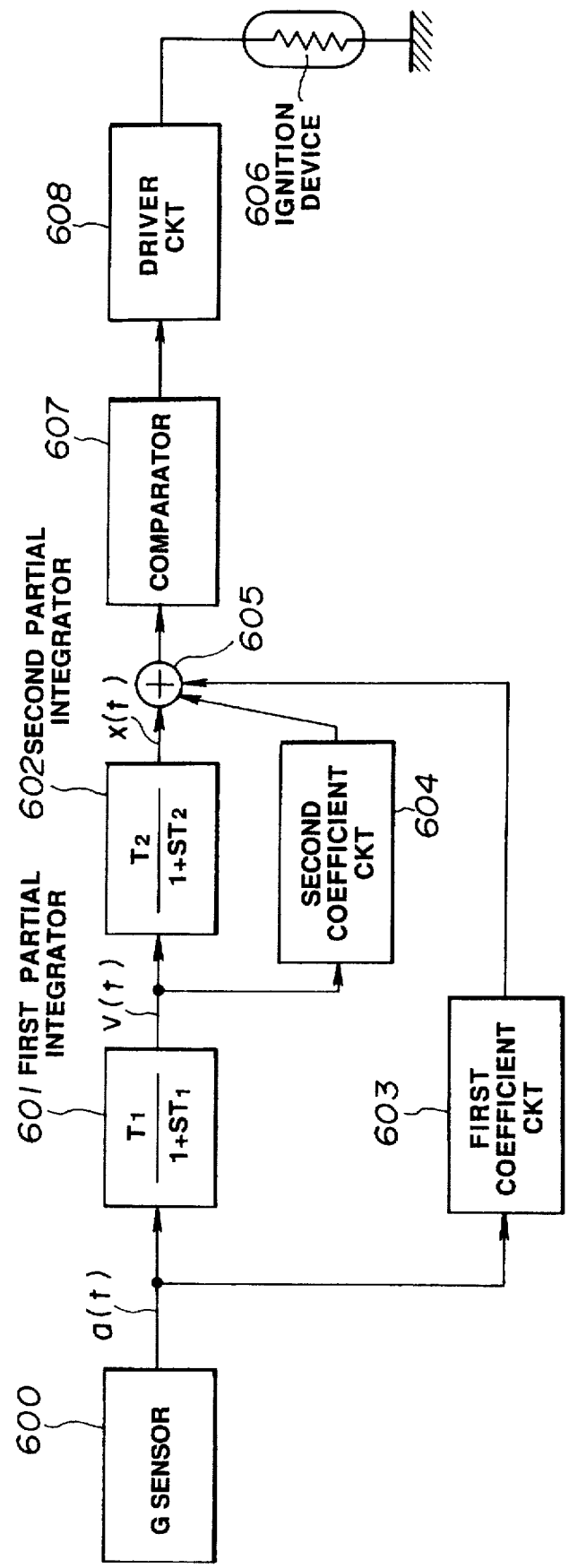
FIG. 8 is a block diagram showing the basic circuit arrangement which enables the effect of a collision induced deceleration on the passenger to be anticipated and for the position of the passenger's head to be accurately estimated.

FIG. 8 shows the general arrangement of the displacement prediction circuit section used in the previously described systems, in block diagram form.

As will be appreciated, vehicle mounted control systems are subject to a lot of noise which can become mixed with the output of the G sensor unit used to detect collisions. The present embodiment is directed to solving problems which tend to be encountered with the prior art as a result of noise and/or offset or drift in the sensor output.

The instant embodiment of the invention is such as to use close to near full integration of an acceleration sensor output in a manner which enables the time at which the passenger will strike against a steering wheel or the like rigid structure to be accurately determined and this accurate determination is used for controlling the timing of the air-bag deployment.

In the FIG. 8 arrangement, the first and second partial integrators 601 and 602 are arranged so that the time constants T1 and T2 are the same. However, it should be noted that it is also possible to arrange the same to have different values.

The first and second integrators 601, 602 are arranged to perform as near complete integration as possible and so that time constants T1 and T2 thereof, are ten times larger than a time period td which is required from the time a signal is issued to the time the air-bag reaches full inflation.

The first coefficient circuit 603 is arranged to have an attenuation ratio K1 while the second coefficient circuit 604 is arranged to have an attenuation ratio of K2. In this instance value of K2 is set equal to the time td (K2=td) which is required from the time the ignition current is supplied to the time the air-bag achieves full inflation, while the value of K1 is set equal to $td^2/2$ (viz., $K1=0.5td^2$).

The adder circuit 605 is arranged to receive the outputs of the second integrator 602 and the first and second coefficient circuits 603, 604. The output of the adder 605 is connected with an ignition device 606 by way of a slice level switch or threshold level comparator 607 and a suitable, driver circuit 608.

Operation

Assume that while a vehicle is moving at a fixed speed, it collides with some substantial structure and is subject to a longitudinal deceleration a(t). Further assume that a signal indicative of the same is generated by the G sensor unit 600, and that from the point in time the vehicular deceleration a(t) is induced, the head of a seated passenger is caused to move forward at a fixed speed under the influence of the same.

Under these conditions, the velocity V of the person's head relative to the vehicle can be shown to be:

$$V(t)=\int (a)t\, dt \qquad (2)$$

In accordance with the present invention, the signal from the G sensor unit is supplied to the first partial integration circuit 601 and subjected to almost complete integration. This derives a value indicative of V(t).

The displacement of the passenger's head from its initial position with respect to time is therefore given by:

$$x(t)=\int V(t)\, dt \qquad (3)$$

By subjecting the output of the first integrator 601 to a second partial integration in the second integrator 602, it is possible to obtain a displacement value x(t).

By weighting the V(t) value with a factor td (viz., V(t)×td) in the second coefficient circuit 604, it is possible to determine the amount of displacement which will occur in the time period due velocity V(t).

Further, by weighting the output of the G sensor unit with a factor of $td^2/2$ (viz., $½×a(t)×td^2$) in the first coefficient circuit 603, it is possible to derive the amount displacement which will occur due to the acceleration a(t).

By summing the three displacement values in the adder 605, it is possible to derive (predict) the displacement which will have occurred from the instant point in time t until the end of the time period td. Viz.:

$$x(t+td)=[x(t)]+[V(t)×td]+[½×a(t)×td^2] \qquad (4)$$

The signal indicative of this predicted displacement x(t+td) is then compared with a predetermined slice level in the comparator circuit 607. When the slice level is exceeded, a signal which ignites the air-bag inflation charge, is generated.

Figure 10A:
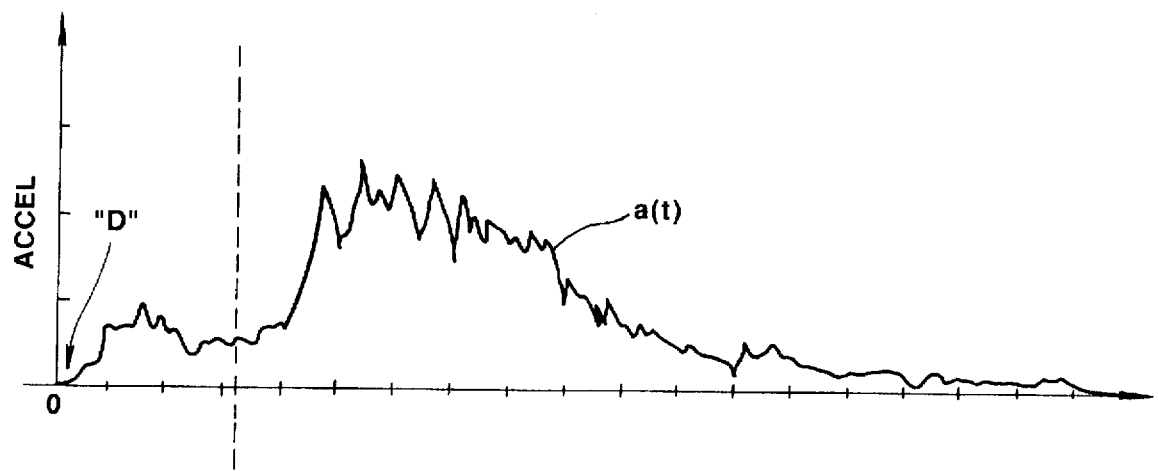
FIGS. 10A and 10B are graphical time charts which depict the operations which characterize the circuit arrangement depicted in FIG. 8.
Figure 10B:
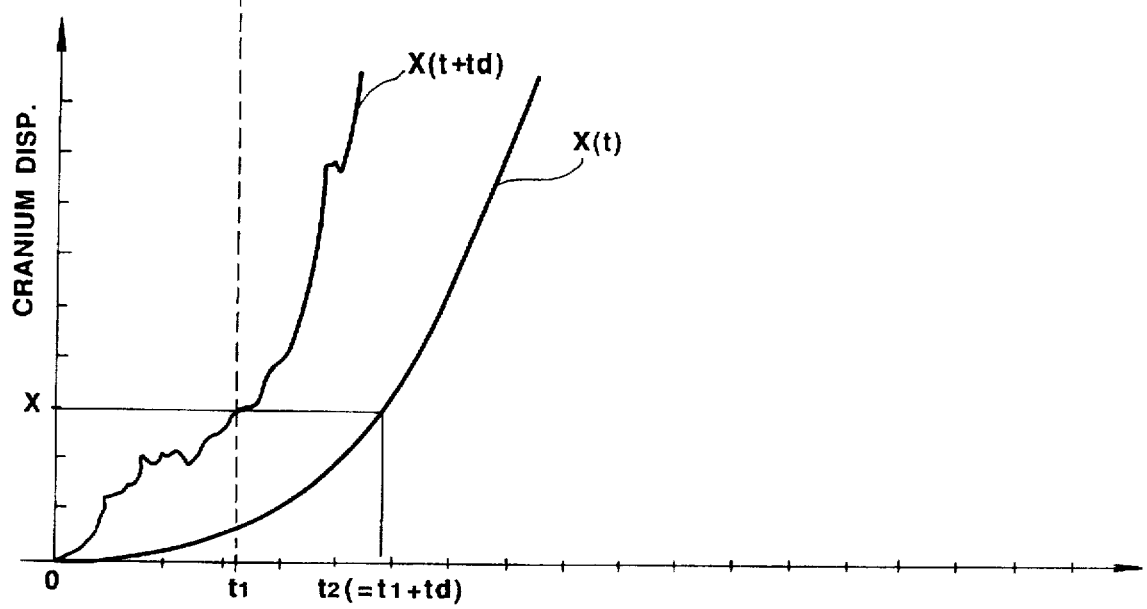

An example of the above type operation is graphically depicted in FIGS. 10A and 10B. FIG. 10A shows an example of how the acceleration varies with time, while, Fig 10B compares the manner in which the output of the adder and the actual displacement of the occupant's head, vary with respect to time.

As particularly clear from FIG. 10B, the trace x (t+td) of the output of the adder is such as to increase more rapidly than the trace x(t) which depicts the actual movement of the occupants head. Thus, by setting the slice level at X, it is possible to have the output of the adder exceed this level at a time point ti which is td seconds prior the point in time the occupant's head will actually reach said location. Accordingly, by issuing the air-bag ignition signal at time t1, the air-bag will be fully deployed and have just reached maximum inflation at the time the occupant's head and upper torso actually come into cushioning contact with the same.

In a particular example-wherein an air-bag is mounted on a steering wheel, it takes about 30 ms for fully deploying the air-bag upon issuance of the air-bag ignition signal. Several tests using this type of air-bags have revealed that if the air-bag ignition signal is issued at the time which is 30 ms prior the time the driver's head will reach the position four inches before the steering wheel, optimum cushioning effect is obtained by the air-bag.

Figure 9:
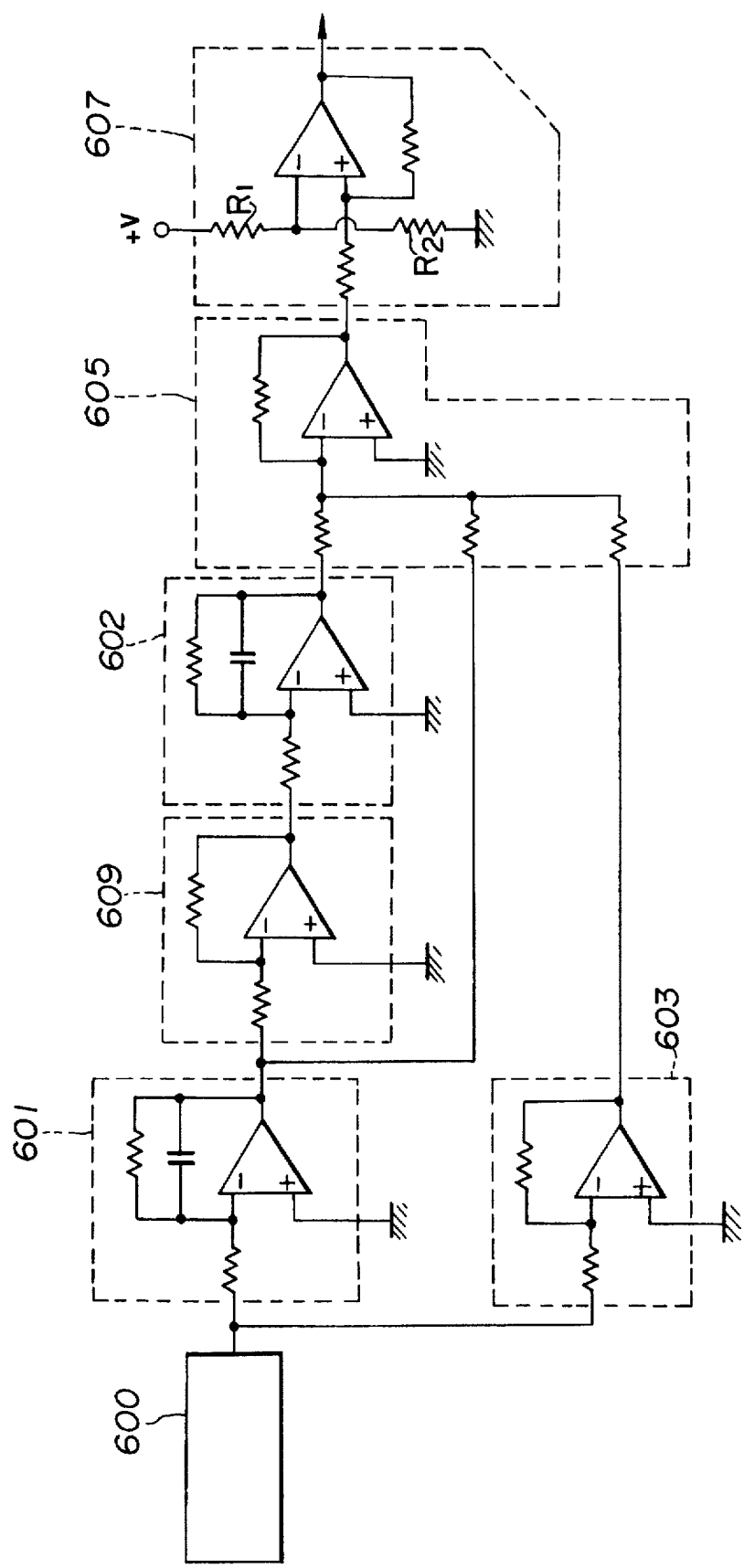
FIG. 9 is a circuit diagram showing the arrangement depicted in FIG. 8, in more detail and highlighting the simplicity which characterizes a sixth embodiment of the invention.

FIG. 9 shows an example of the actual hardware which can be used to achieve the above described functions. The circuit arrangement will be self-explanatory via comparison with the block diagram of FIG. 8. However, it should be noted that the second coefficient block 604 is omitted. This omission is achieved by arranging the input of the second coefficient circuit to be multiplied by 1. On the other hand, it will be noted that an addition of a polarity re-reversal circuit 609 has been made between the first and second integrators 601, 602 in order to unify the polarities of the signals which are received at the adder.

As is understood from the above, in the present invention, the formula (4) is used for predicting the displacement of the driver's head upon a vehicle collision. As will be seen when comparing the formula (4) with the afore-mentioned formula (1) used in the prior art (via. U.S. Pat. No. 4,985,835), the former has no differential term added thereto. This is because of the reasons which have been described hereinafore. That is, the inventors have assumed that if the acceleration signal is provided by an acceleration sensor fitted to the driver's head, the displacement prediction can be precisely carried out from the prior art formula (1). However, in practice, the acceleration sensor is mounted on a vehicle. In this case, the acceleration signal necessarily contains a lot of noise. Furthermore, in the present invention, it has been assumed that upon a vehicle collision, the driver's head would be moved forward at a constant acceleration because of the flexible construction of the upper part of the driver. As a result of simulations and actual crash tests, it has been found that the formula (4) is more practical than the formula (1).

Figure 10C:
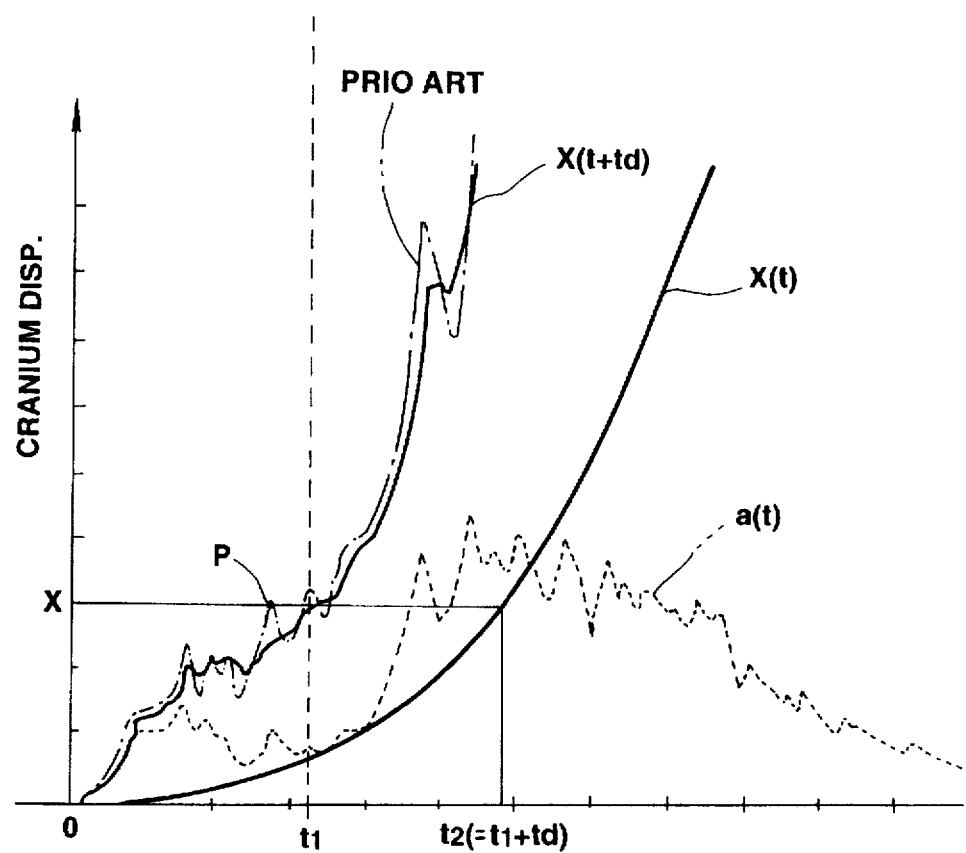
FIG. 10C is a time chart similar to FIG. 10B, but showing in phantom line the operation which is proposed by U.S. Pat. No. 4,985,835.

For clarifying the advantage obtained by the formula (4), FIG. 10C is provided which shows both the trace curve x(t+td) of the output of the adder in the invention and a corresponding trace curve (prior art) expected from the system disclosed in U.S. Pat. No. 4,985,835. In case of the US Patent, usage of the formula (1) makes the trace curve (prior art) oscillate more than the trace curve x(t+ts) of the invention. The oscillation or roughness is caused by the differential term (viz., $K4*da/dt(tx)*Z^3/3$) contained in the formula (1). As is seen from the graph of FIG. 10C, the oscillating trace curve tends to induce an erroneous prediction of the head displacement. That is, a peak "P" formed on the trace curve exceeds the slice level X at a time point prior to the time point t1.

Figure 10D:
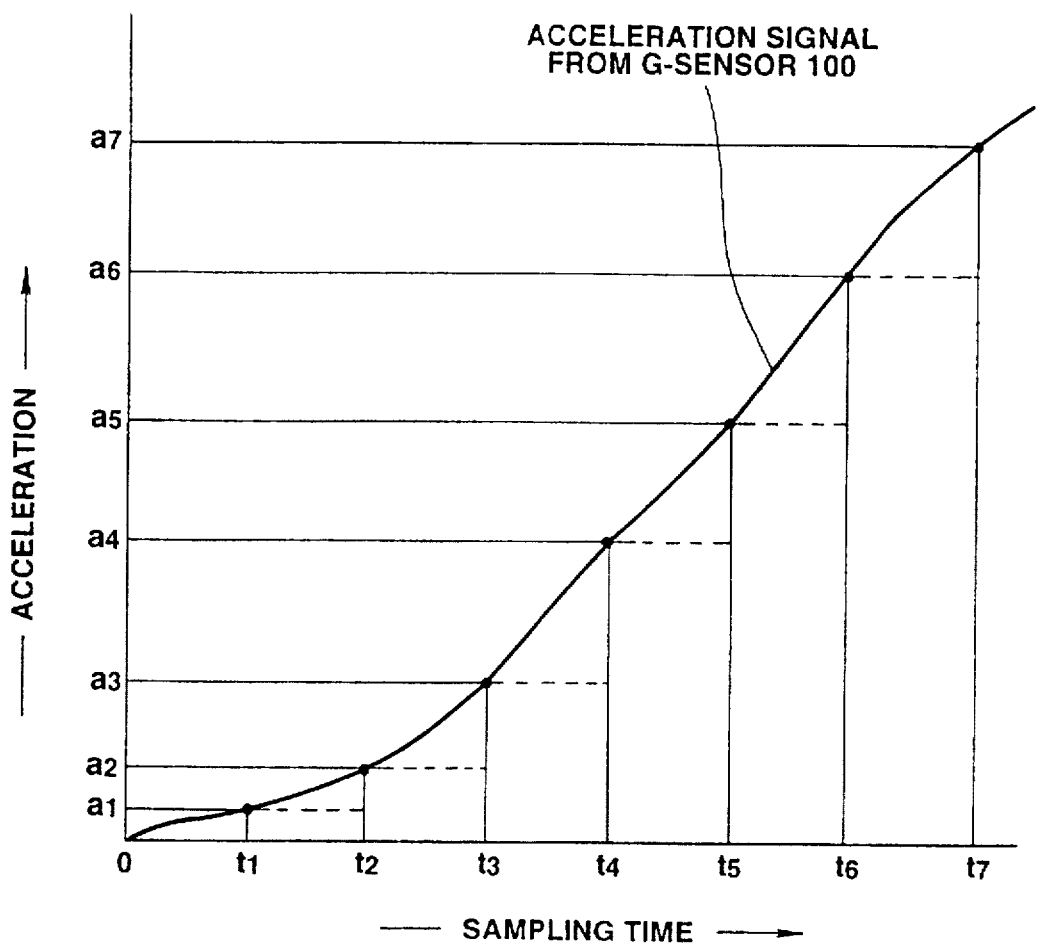
FIG. 10D is a graph showing the manner in which an acceleration signal issued from a G-sensor is sampled.

For clarifying the meaning of the constant acceleration with which the driver's head would move forward upon a vehicle collision, FIG. 10D is provided which is an enlarged view of the part indicated by reference "D" in FIG. 10A, showing the manner in which an acceleration signal is sampled. That is, in operation, the acceleration signal issued from the G-sensor 100 is successively sampled at the times t1, t2, t3 ... t7 ... tn. That is, if the acceleration signal is sampled at the time t3, the acceleration shows the value "$a_3$" as shown. Upon this, the "displacement prediction" section SEC.01 inputs the value "$a_3$" and carries out the formula (4) for predicting the displacement of the driver's head. If the predicted displacement is still smaller than the slice level "x", the sampling is then made at the time t4 and similar operation is carried out in the section SEC.01.

It is to be noted that in the present invention, in the period from the time t3 to the time t4, the acceleration value actually fed to the displacement prediction section SEC.01 is the fixed value "$a_3$" irrespective of the change of acceleration issued from the G-sensor 100 during such period. That is, in the present invention, during such period, it is presumed that the acceleration is constant (that is, fixed).

Seventh Embodiment

Figure 11:
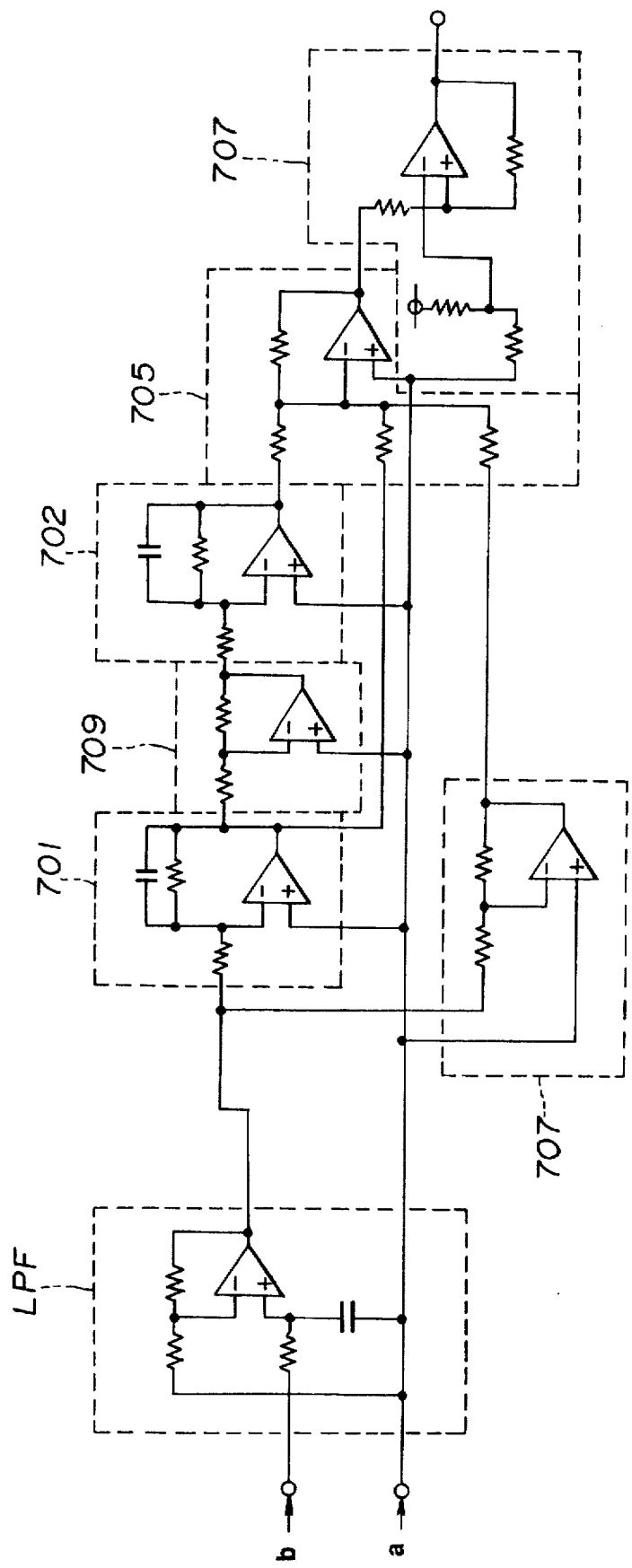
FIG. 11 is a circuit diagram showing a circuit arrangement which characterizes a seventh embodiment of the present invention.

FIG. 11 shows a second example of the circuitry which can used to constitute the arrangement depicted in block diagram form in FIG. 8. It should be noted that this figure shows two input terminals a and b. Terminal a is arranged to receive a signal indicative of the sensed acceleration while terminal b is arranged to be connected to a reference voltage terminal which is provide on the sensor unit. This dual terminal arrangement allows the prediction circuit arrangement to operate on the same reference voltage as is being used in the G sensor unit. Examples of such types of sensors will be described in connection with FIGS. 22 and 23.

In the illustrated arrangement a low pass filter LPF is operatively interposed between the sensor inputs terminals a and the first integrator 701.

Eighth Embodiment

Figure 12:
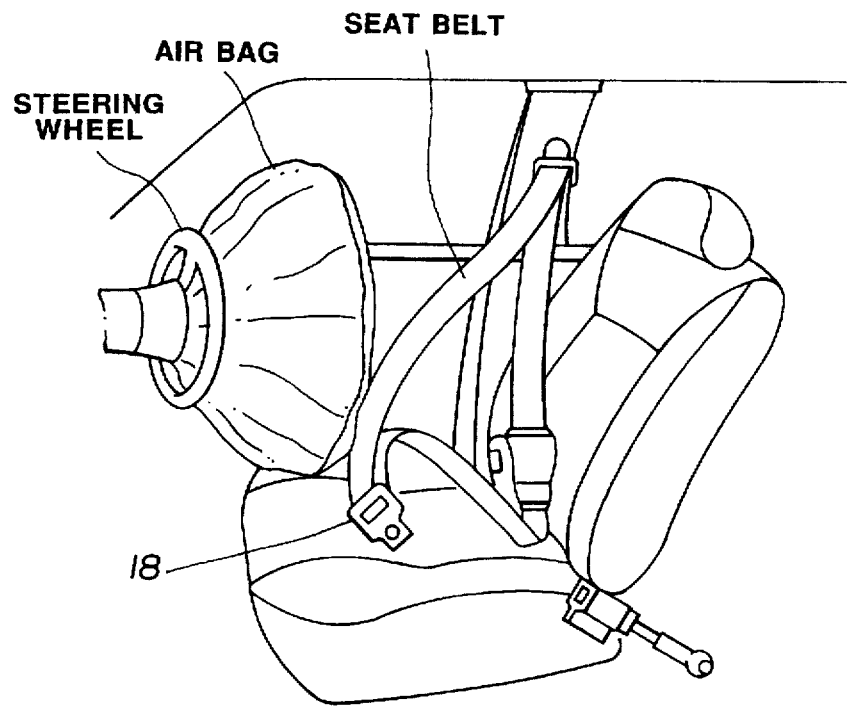
FIG. 12 is a perspective view showing a steering wheel mounted air-bag in a deployed condition and its relationship with a driver's seat.
Figure 13:
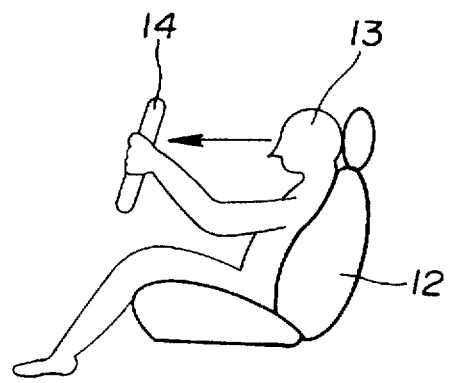
FIGS. 13 to 15 show the effects of driving and seat position on the distance between the driver's head and the steering wheel.
Figure 14:
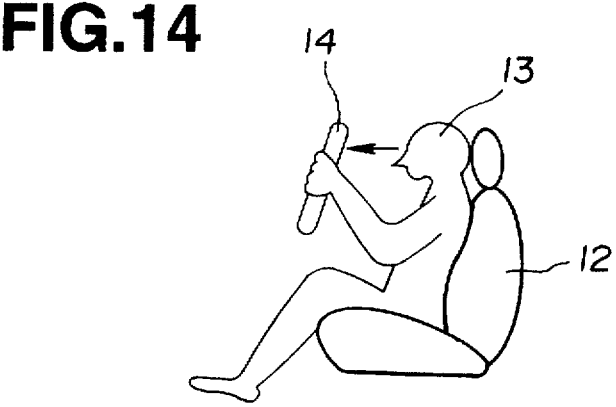
Figure 15:
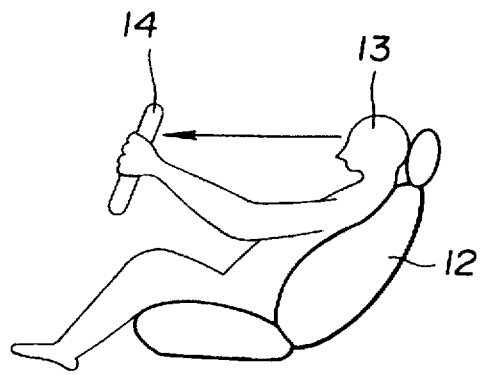

FIG. 12 shows a drivers seat, a steering wheel, and air bag in a deployed state and a lap and sash type seat belt arrangement. FIGS. 13–15 show various driving postures and the effect on the distance between the driver's head and the steering wheel.

As will be appreciated, the driving postures illustrated in FIGS. 13 to 15 are going to change the head to steering wheel distance and the amount of displacement which can be permitted before the ignition of the air-bag inflation charge need be detonated.

Some of measurable factors which will influence/indicate this distance are set position, seat back angle, the wearing of a seat belt and the depression of the brake pedal.

The effect of the first two factors can be seen in FIGS. 13 to 15. The application of the brakes by the driver can be taken as indicating that he or she was aware of the impending danger and would have tended to grip the steering wheel and brace against the anticipated impact. This of course slows the driver's movement toward the steering wheel.

The wearing of a seat belt can be used to determine the position of the front of the passenger's body. For example, if the driver is a vary large person the amount of seat belt that must be paid out is more than in the case of a thin person for the same seat position and seat back angle. Alternatively, if the seat is moved rearwardly the amount of seat belt that will be paid out of a retractor will be less than in the case the same person sat in the seat with seat in a more forward position. In other words, the amount of seat belt which paid out is can be used to estimate where the "front" of the passenger is and therefore the distance between the front surface of the person and the steering wheel or the like.

Figure 16:
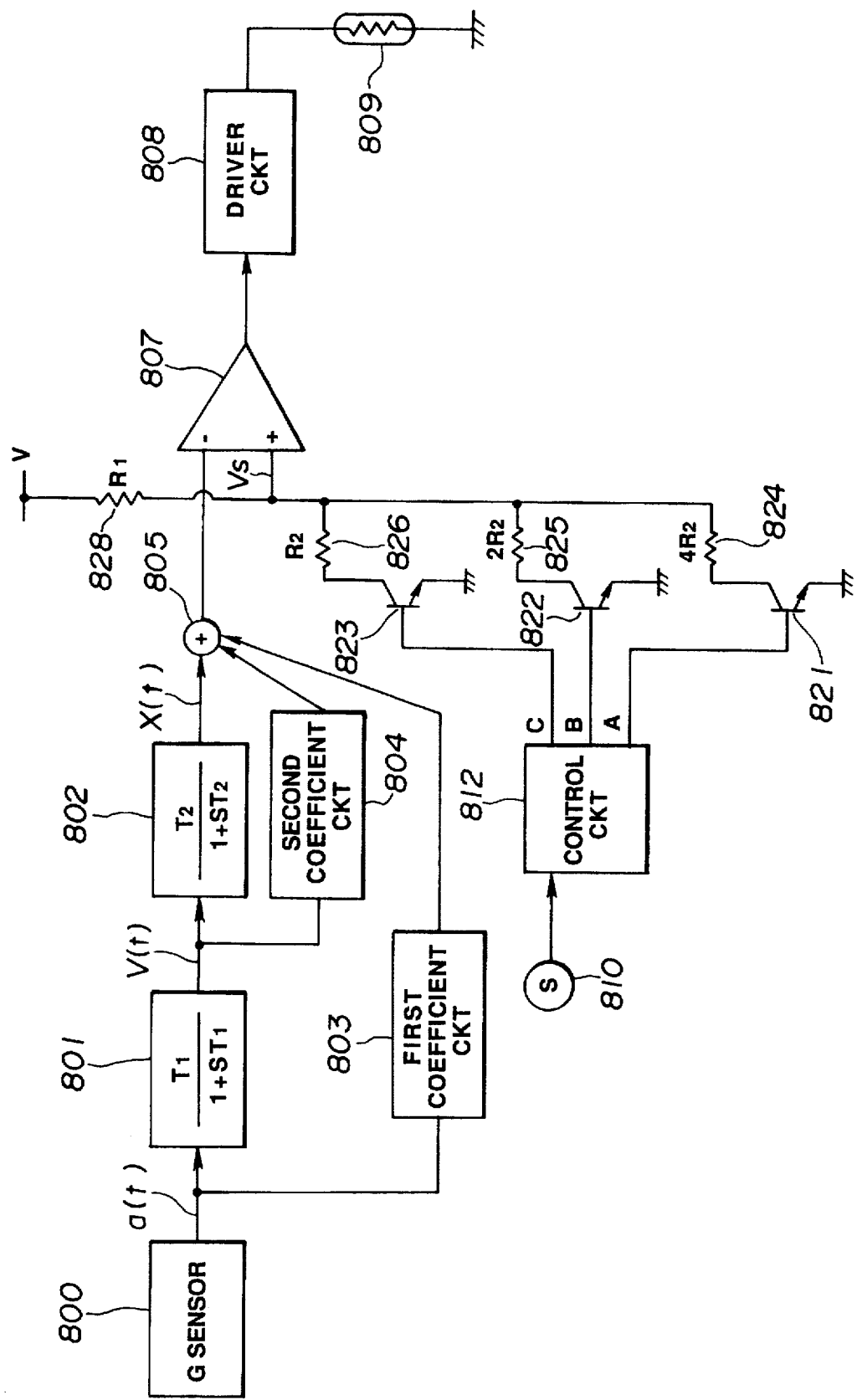
FIG. 16 is a circuit diagram which shows the arrangement of a sensor and a control circuit via which the appropriate selection of control resistances are selected in accordance with an eighth embodiment of the present invention.

FIG. 16 shows a circuit arrangement which characterizes the eighth embodiment of the invention and which enables the effect of the distance which is induced by the position of the seat (viz., the position of the seat in the fore and aft direction of the vehicle) and the reclining angle of the seat back.

In this arrangement a G sensor unit 800, first and second integrators 801 and 802 and first and second coefficient circuit 803 and 804 are coupled with an adder 805 in the illustrated manner. In this instance the output of the adder 805 is coupled with the negative input terminal of a comparator 807. The output of the comparator is connected with a driver circuit 808 and an ignition device 809.

A seat position sensor 810 which detects how far rearwardly the seat has been moved from a forward position, is coupled with a control circuit 812. In the case of power assisted vehicle seats, the seat position sensor can take the form of a counter which counts up and down in accordance with the pulses produced by a motor used to motivate the fore and aft movement of the seat. Alternatively, in the case of manually adjustable seats, a slide type resistor or the like type of arrangement can be used.

The control circuit 812 is arranged to respond to the input from the position sensor 810 and selectively control the ON/OFF status of three signals A, B and C which are output therefrom. The control signals A, B and C are applied to the bases of transistors 821, 822 and 823 respectively. These transistors control the grounding of resistors 824, 825 and 826. As shown, these resistors which exhibit decreasing resistance values of 4R2, 2R2 and R2 respectively, are connected in parallel and are connected with the positive input terminal of the comparator 807 and a source of voltage V via a resistor 828. In this case the resistor 828 has a resistance of R1.

As will be appreciated, the resistance 828 and resistances 824, 825 and 826 are arranged to form a voltage divider. By controlling the conductivity of the transistors 821, 822 and 823 the voltage Vs appearing on the positive terminal of the comparator can be varied. This of course varies the level of the slice level which must be crossed in order to ignite the air-bag inflation charge.

As it is not practical with the above type of arrangement to have a situation wherein all three control signals assume LOW levels, it is possible to have 7 control states (viz., $2^3-1$ states). Accordingly, the control circuit is arranged to divide the input of the seat position sensor 810 into 7 levels as shown in FIG. 17A. The most forward position is attributed level 1. Under these conditions, the level of only signal A is raised to high level and thus only transistor 812 is rendered conductive. Under these conditions, the voltage Vs appearing at the positive input terminal of the comparator 807 is determined by the voltage division which occurs between resistors 828 and 824.

As the seat is moved rearwardly, the manner in which the transistors are grounded is changed. For example, if the seat is moved back to level 3 for example, both of the transistors 821 and 822 are rendered conductive thus grounding the corresponding resistors 824 and 825. The combined resistance thus amount to 4/3R2 and the voltage Vs changes accordingly. As the seat is moved rearwardly, the resistance on the lower side of the voltage divider lowers 4R2→2R2→1.33R2→1.0R2 etc.

For example, when the seat is moved all the way back to level 7 the resistance lowers to 4/7R2 and the voltage Vs becomes:

$$Vs = \frac{V \cdot \frac{4}{7} R2}{\left(\frac{4}{7} R2 + R1\right)} \quad (5)$$

Conversely, when the seat is set in its most forward position the situation is such that:

$$Vs = \frac{V \cdot 4R2}{4R2 + R1} \quad (6)$$

while in the case of level 4 the situation is such that:

$$Vs = \frac{V \cdot R2}{(R1 + R2)} \quad (7)$$

As the value of Vs increases the timing with which the air-bag inflation is induced is delayed.

FIG. 17B shows the manner in which the above technique can be adapted to seat back inclination angle. That is to say, by sensing the seat back angle and dividing the angle range through which the seat can be selectively set for driving into 7 units, it is possible to vary the voltage Vs in a manner to take into account the increase in distance of the driver's head from the steering wheel which will result from the angling.

If it were desired to combine the effect of seat position and seat back inclination, so that the effect on the head-steering wheel distance by a fully rearward seat position and maximum reclining angle, could be taken into account, the number of levels could be increased by adding a fourth control signal D and a fourth transistor and resistor (by way of example). The other possible alternatives via which the value of Vs could be adjusted, such as parallel resistor ladders etc., will be obvious to those skilled in the art of electronics given the above conceptual guidance.

Ninth Embodiment

Figure 18:
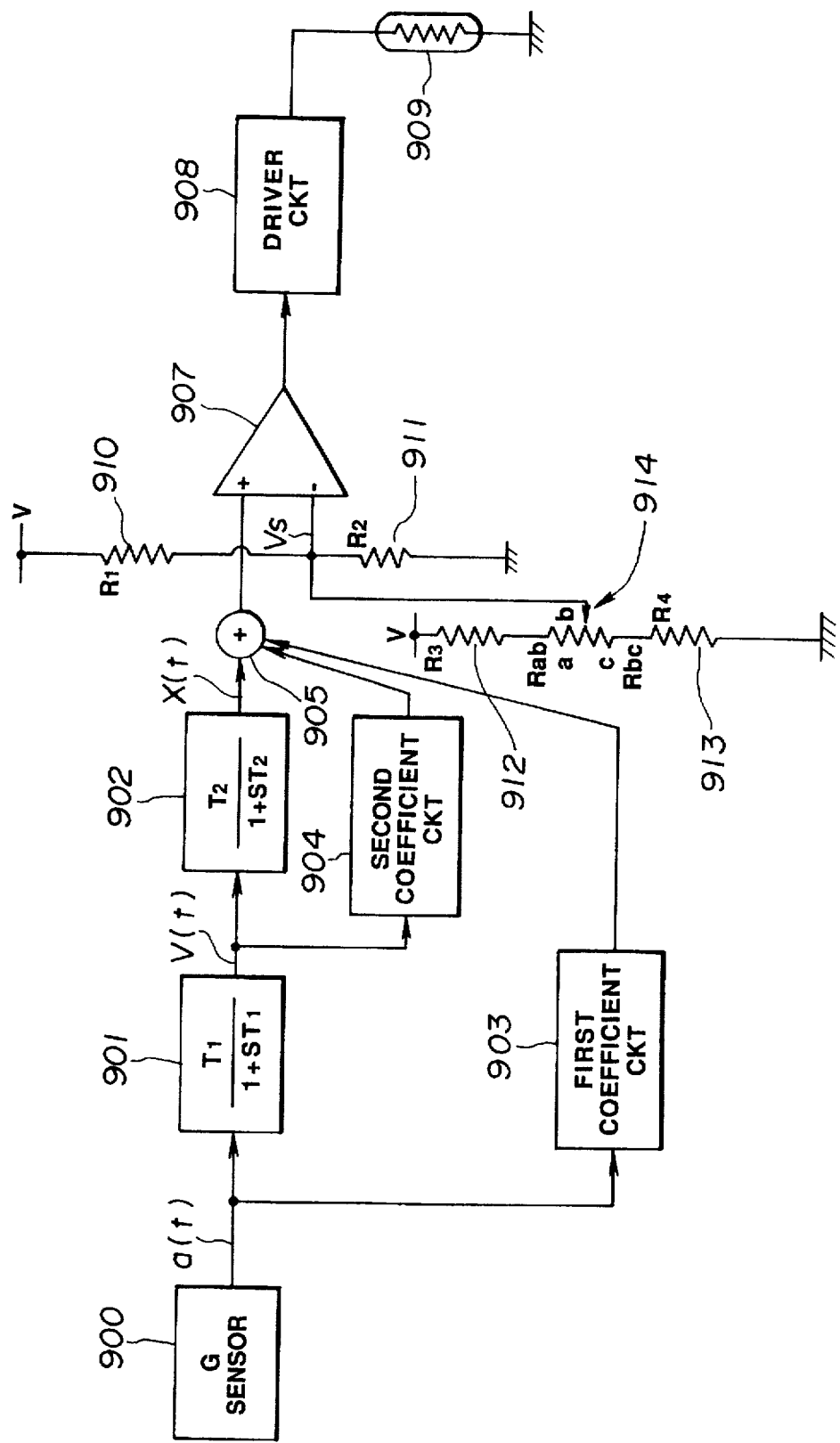
FIG. 18 is a circuit diagram according to an ninth embodiment of the invention showing an arrangement which can employ the sensor arrangement which detects the length of seat belt which is drawn out of a retractor, to determine the position of the passenger to be protected by the air bag or like type of restraint system.
Figure 19:
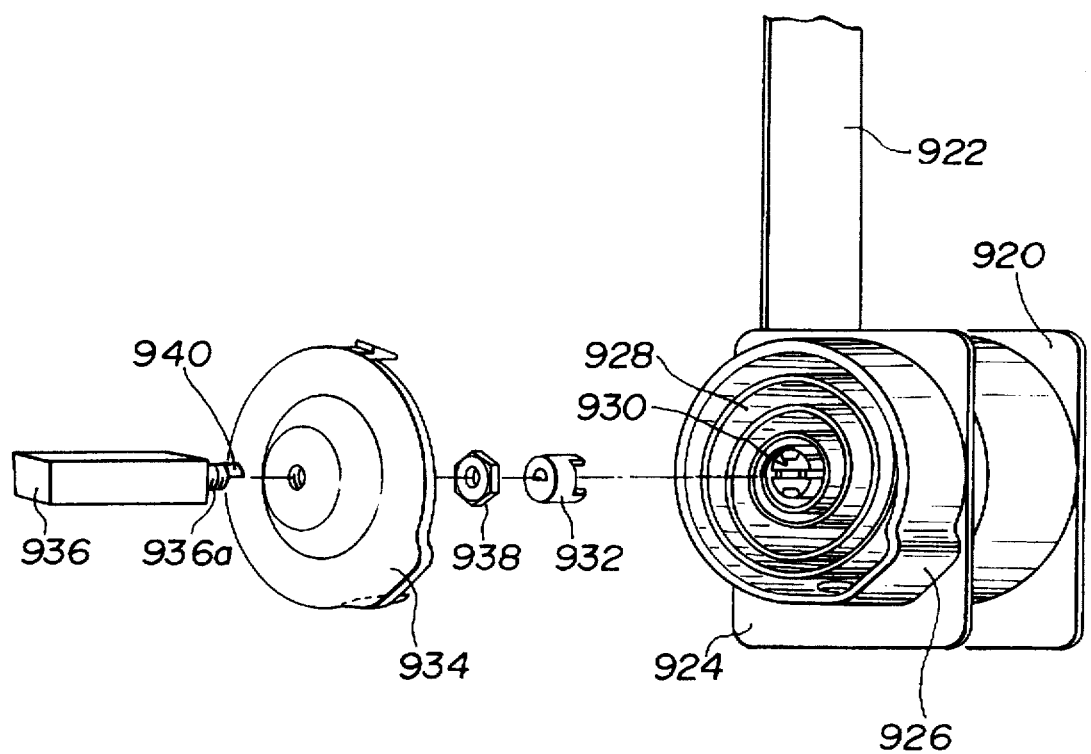
FIG. 19 is a perspective view showing the construction of a sensor which can be disposed with the seat belt retractor in order to determine how much of the belt is paid out and which can be used with the circuit arrangement shown in FIG. 18.

FIGS. 18 and 19 show a sensor/circuit arrangement which can be used with a seat belt retractor in order to approximate the location of the front of the person seated therein and therefore the distance from the steering wheel. Viz., as the retractor will be fixed and immovable with respect to the vehicle chassis, as the amount of seat belt which is paid out of the retractor, increases, it can be assumed that distance between the driver and the steering wheel has reduced.

FIG. 18 shows a circuit arrangement which embodies a ninth embodiment of the invention and wherein the reference voltage Vs which determines the slice level of the comparator 907 is determined by a voltage dividing arrangement which is comprised of four fixed resistances 910, 911, 912 & 913 and a variable resistance 914 coupled in the illustrated manner.

Assume that the variable resistance 914 is arranged so that the movable contact b divides the resistor into to variable halves Rab and Rbc. Under these conditions the reference voltage appearing on the input terminal of the comparator 907 can be shown to be:

$$Vs = \frac{V \cdot (R2//R4 + Rbc)}{\{R1//(R3 + Rab) + R2//(R4 + Rbc)\}} \quad (8)$$

In this instance the variable resistor is arranged to respond to a parameter which varies with the amount of seat belt which is drawn out of the retractor mechanism. In this embodiment it is assumed that as the amount of seat belt used increases, the distance between the passenger (in this particular instance the driver) and the steering wheel, reduces. Accordingly, as the amount of belt which is drawn out of the retractor is increased, the value of Vs is reduced in a manner to advance the timing with which the inflation signal is issued. Contrarily, as the amount belt which is drawn out of the retractor reduces, indicating an increased head-steering wheel distance has increased, it is preferable to increase the Vs level and delay the deployment timing.

FIG. 19 shows in perspective view, a possible sensor arrangement which can be used to detect the amount of seat belt which is drawn out of a retractor mechanism. In this arrangement the numeral 920 denotes a retractor mechanism which is adapted to reel in seat belt 922. The mechanism includes a case 924 on which an essentially circular flange 926 is formed. A convolute torsion spring 928 is disposed within the space defined within the flange 926 and operatively connected with a shaft 930 which forms part of reel onto which the seat belt 922 is wound, in a manner wherein as the seat belt 922 is drawn off the reel, the tension in the spring 928 increases. The end of the shaft 930 is formed with recesses which are arranged to facilitate the mounting of metallic cap member 932. In this arrangement the cap member 932 is formed with leg portions which are received in key slots formed axially along the shaft 930. When disposed in position, the cap 932 is synchronously rotatable with the reel shaft 930.

A circular cover 934 is arranged to be snap fastened to the flange 926 in a manner to close off the space in which the spring 928 is disposed. A sensor housing 936 is formed with a threaded portion 936a which extends through an opening formed in the cover 934 and is secured thereto by a nut 938. The end of a rotatable sensor shaft 940 which projects out of bore formed in the threaded portion 936a, is adapted to be received in a half-moon shaped opening formed in the cap member 932.

With this arrangement, the sensor shaft 940 and the reel shaft 930 are interconnected so as to rotate together. When the shafts rotate in a first direction the variable resistance 914 which is disposed in the housing is arranged to increase while when the shafts rotate in the opposite direction the resistance of the variable resistance is arranged to decrease.

Figure 20:
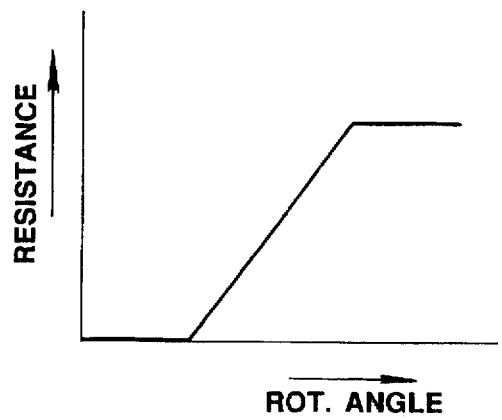
FIG. 20 is a graph which shows the manner in which the variable resistance is varied with the rotational angle indicated by the seat belt sensor shown in FIG. 19.

FIG. 20 shows in graphical form, one possible rotational angle/resistance relationship which can be produced with the instant embodiment. Viz., as the amount of rotation of the seat belt reel and shaft 930 increases, the resistance which is used to control the Vs level increases linearly to a maximum level and then levels off.

It will of course be appreciated that wearing a seat belt influences the speed at which the passenger's body will move in response to a vehicular deceleration. This change in speed naturally influences the selection of the resistances to be used in the circuit.

Tenth Embodiment

Figure 21:
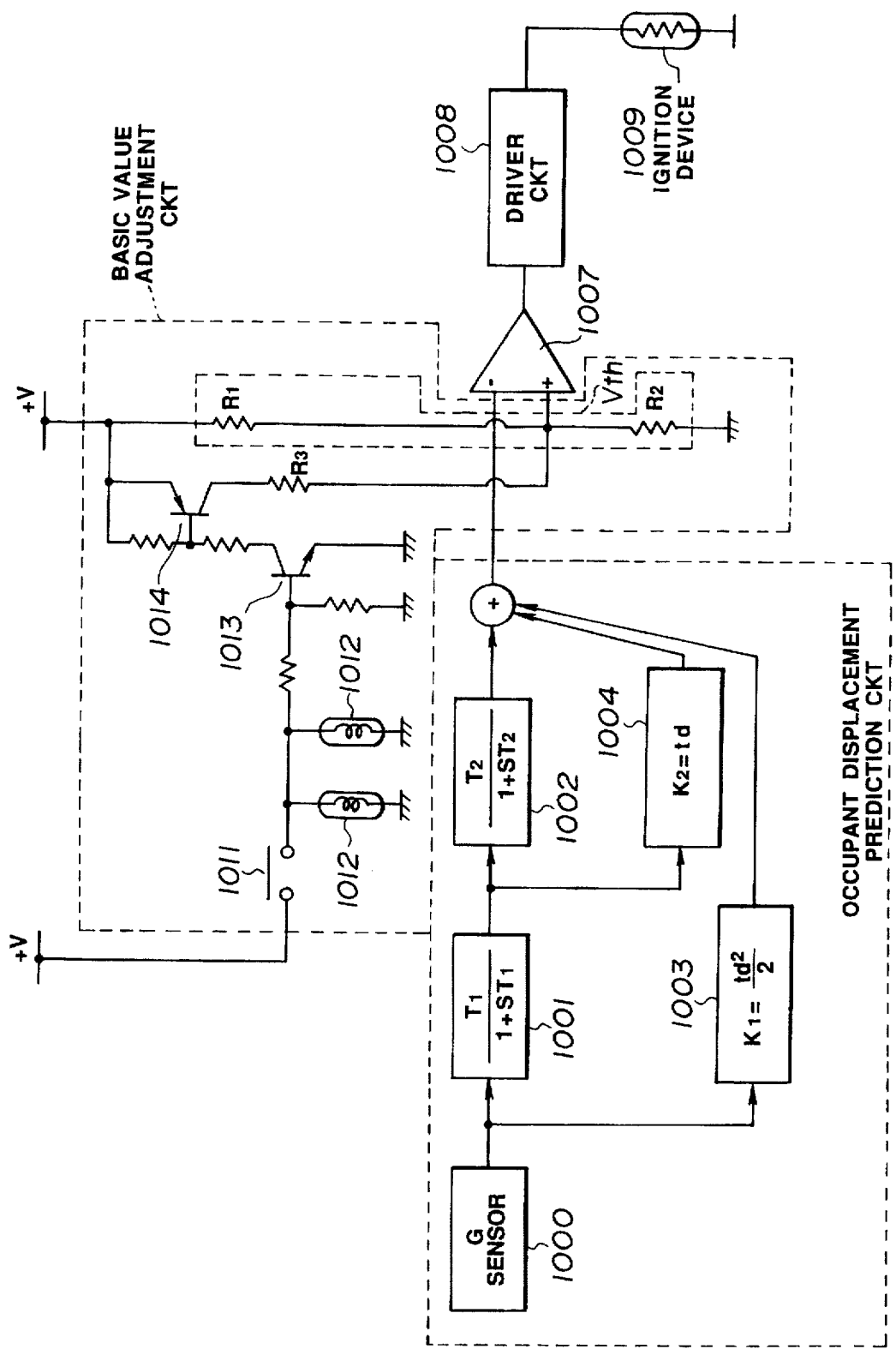
FIG. 21 is a circuit diagram showing an arrangement which characterizes a tenth embodiment wherein the status of the brake pedal is sensed and used to modify the timing with which the air-bag is deployed.

FIG. 21 shows a circuit arrangement which characterizes a tenth embodiment of the invention.

This arrangement is directed to modifying the slice level in accordance with the brake pedal depression.

In this embodiment the reference voltage Vth which is applied to the comparator 1007 is determined by voltage divider comprised of resistors R1 and R2 and a circuit arrangement which includes a brake switch 1011, brake lamps 1012, a switching transistor 1013 which is responsive to the closure of the brake switch 1011, a relay transistor 1013 which is responsive to the switching transistor assuming a conductive state, and a resistor R3 which is circuited between the collector of the relay transistor 1014 and the tap of the voltage divider.

With this arrangement, in the event that the brake pedal is being depressed and the brake switch 1011 is closed and the brake lamps 1012 are illuminated by the passage of current therethrough. At the same time a voltage is applied to the base of the switching transistor 1013 which is accordingly rendered conductive. This permits current to flow therethrough and cause the relay transistor 1014 to also assume a conductive state. Under these conditions the reference voltage Vth is induced to rise due to effect of resistor R3 being placed in the voltage dividing circuit. This elevates the slice level which must be reached before the air-bag inflation decision can be made.

On the other hand, in the event that the brake pedal is not depressed and the brake switch is open, the reference voltage Vth remains unchanged and the slice level is not elevated in the above manner.

Accordingly, with this embodiment, in the event that the brake pedal is depressed, it is assumed that the driver is aware of the pending impact and has gripped the steering wheel and braced in a manner which will slow the rate at which he or she moves toward the steering wheel under the influence of the deceleration. Under these conditions, the delaying of the air-bag deployment timing is advisable in order to ensure the most effective benefit of the bag is derived.

Under some circumstances, the elevation of the slice level may actually obviate an unnecessary usage of the rather expensive safety device, which for obvious reasons can only be used once.

Eleventh Embodiment

Figure 22:
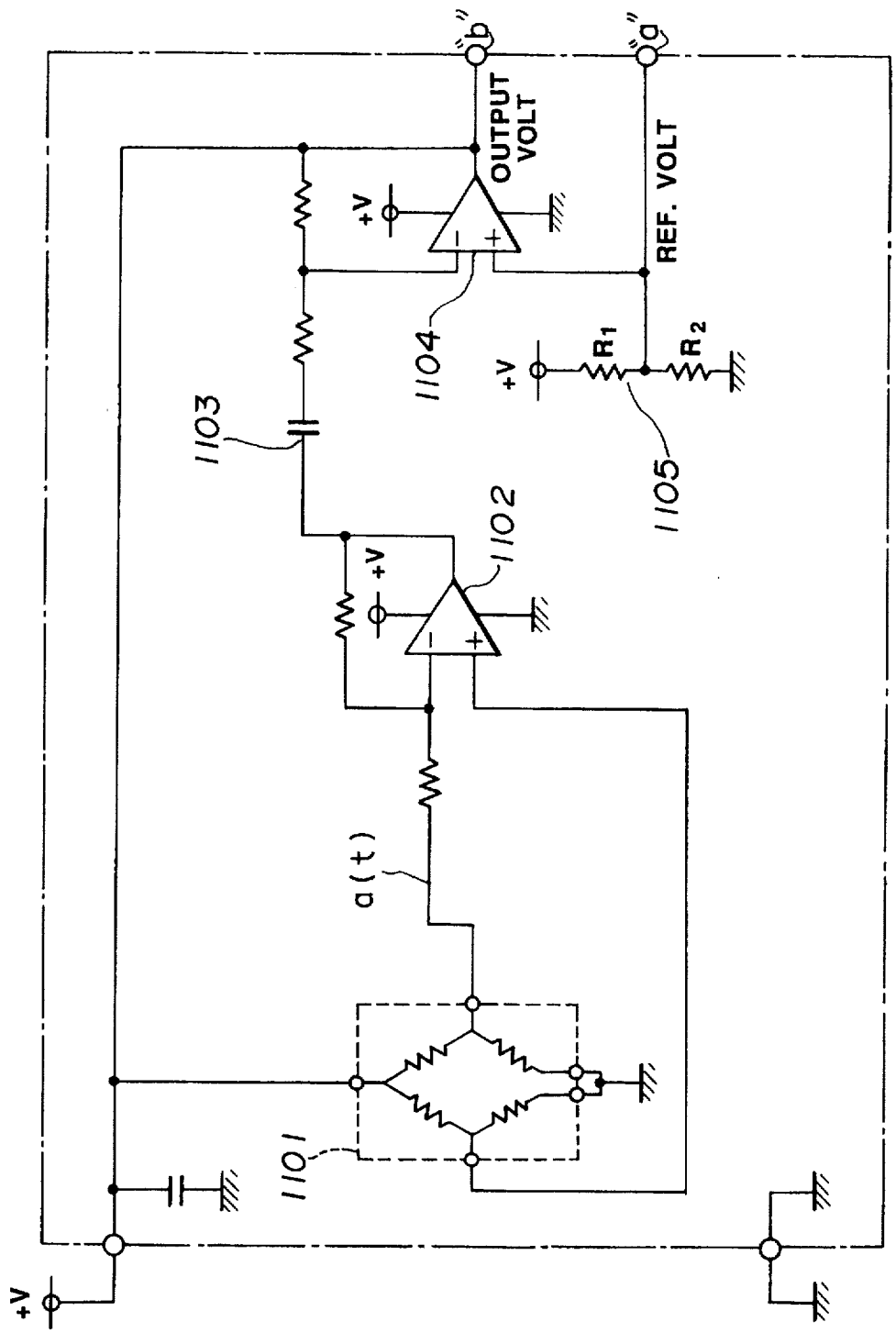
FIG. 22 is a circuit diagram which shows the sensor circuit arrangement which characterizes an eleventh embodiment of the present invention.

FIG. 22 shows a G sensor circuit arrangement which can be used as the G sensor unit of the above described embodiments.

As shown, this embodiment includes a resistor bridge type G sensor chip 1101 which is operatively connected with a differential amplifier 1102, a capacitor 1103 and a second differential amplifier 1104 which are arranged and coupled in the illustrated manner. The reference voltage terminal of the second differential amplifier 1104 is coupled with the tap of a voltage divider 1105 comprised of resistors R1 and R2. The tap is also connected with a reference voltage output terminal "a". The output of the second differential amplifier 1104 is connected with a sensor signal output terminal "b" on which a signal indicative of the sensed acceleration appears.

As will be appreciated, with this arrangement as the reference voltage which is produced by the voltage divider 1105 is used as the reference voltage for the second differential amplifier 1104, and the second differential amplifier 1104 receives the acceleration indicative signal, any shifts in the reference voltage level will be reflected in the output thereof. Accordingly, if the same reference voltage is used in the circuit arrangement which processes the G sensor output signal (viz., the signal appearing on terminal "b") the effect of offsets and/or drifts can be obviated.

The instant arrangement can be readily applied to the type of circuit arrangement shown in FIG. 11.

Twelfth Embodiment

Figure 23:
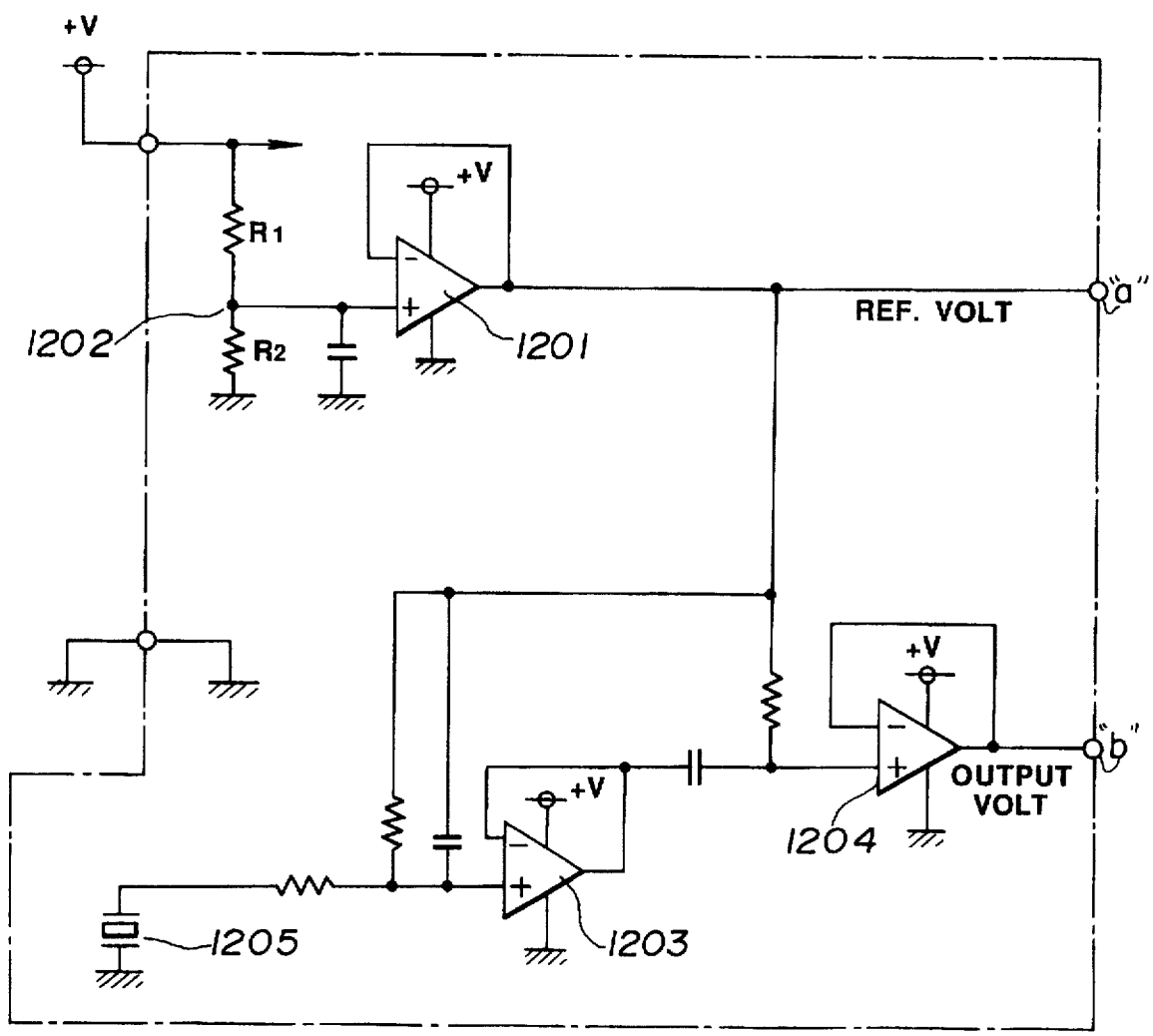
FIG. 23 is a circuit diagram which shows a sensor circuit arrangement which characterizes an twelfth embodiment of the present invention.

FIG. 23 shows a second sensor circuit arrangement which is suited for use with the embodiments of the present invention. In this arrangement a buffer amplifier 1201 is connected between the tap of a voltage divider 1202 comprised of resistors R1 and R2, and a reference voltage output terminal "a". A filter circuit 1203 and a buffer amplifier 1204 are operatively connected between a piezoelectric type G sensor element 1205 and an output voltage terminal "1b" and further with the output of the buffer amplifier 1201.

With this construction, any drifts or offset which occur in the reference voltage will be inherited by the sensor circuit. By using the reference voltage which appears on terminal "a" in the circuitry which utilizes the G sensor signal (which appears on terminal "b") the elimination of undesirable error is rendered possible.

Thirteenth Embodiment

Figure 24:
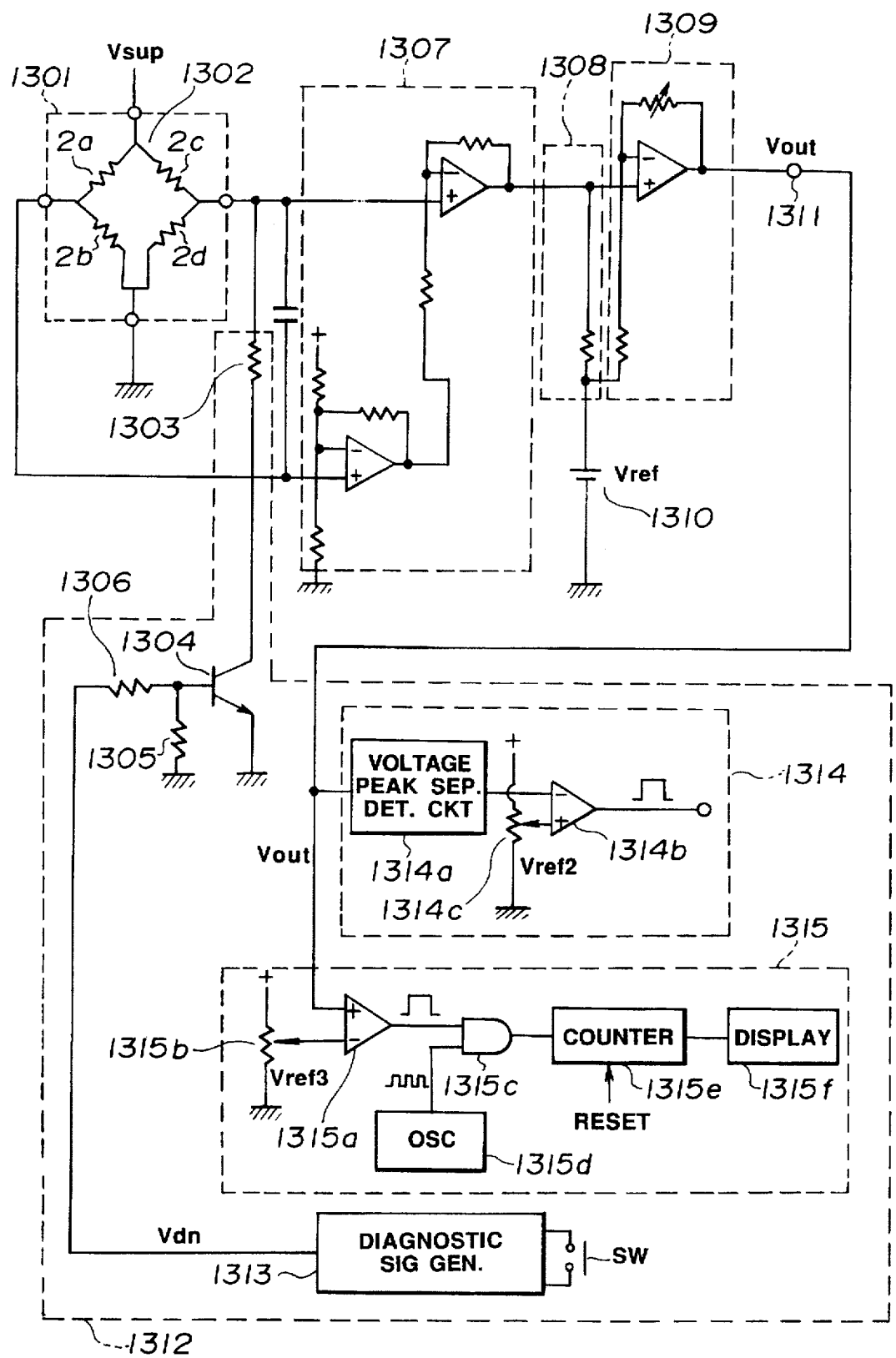
FIG. 24 is a circuit diagram which shows a sensor arrangement which is combined with a diagnostic circuit and which defines a thirteenth embodiment of the present invention.
Figure 26:
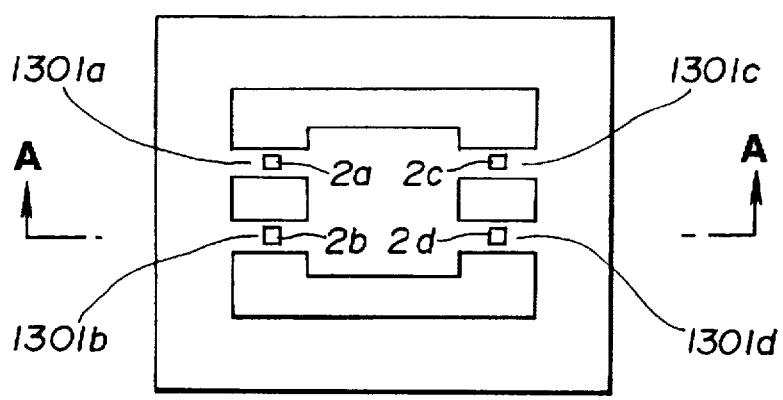
FIG. 26 is a plan view of a sensor structure which can be used with the circuit arrangement shown in FIG. 24.
Figure 27:
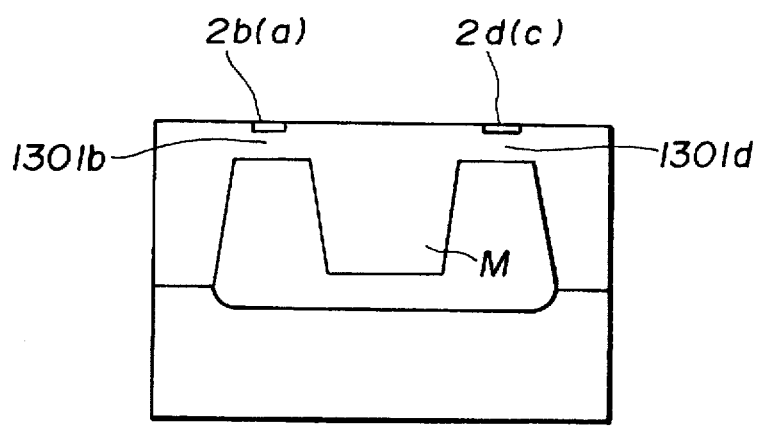
FIG. 27 is a sectional view as taken along section line A—A of FIG. 26.

FIG. 24 shows a circuit arrangement which characterizes a thirteenth embodiment of the present invention. In this arrangement 1301 denotes a sensor chip on which a sensor bridge 1302 is formed. In this instance the bridge is formed of four semiconductor type acceleration sensor elements 2a, 2b, 2c and 2d. In this arrangement the sensor elements 2a and 2c are connected to a junction which is supplied with a source voltage Vsup. The junctions defined between the sensor elements 2c & 2d and 2a & 2b are arranged to output first and second potentials V1 and V2, respectively. Merely by way of example, the four sensor elements can be arranged on bridge members 1301a–1301d which support a G responsive mass M in the manner illustrated in FIGS. 26 and 27.

A resistor 1303 is connected between the junction defined between the sensor elements 2c and 2d and the collector of a NPN type transistor 1304. The resistance of this resistor is set so as to be larger than that of sensor 2d during periods when no strain it applied to the same. The emitter of the transistor 1304 is grounded while the base is coupled with bias resistors 1305 and 1306.

A primary amplification circuit 1307 is composed of operational amplifiers and is coupled to a high pass filter 1308, a secondary amplifier circuit 1309, a source of reference voltage 1310 which is coupled to the secondary amplifier 1309, and an output terminal 1311.

A diagnostic section generally denoted by the numeral 1312, includes a diagnostic signal generator 1313; a first malfunction discrimination circuit 1314 which is associated with the sensor bridge 1302 by way the output terminal 1311, the amplifiers 1307 and 1309 and the high pass filter 1308; and a second malfunction discrimination circuit 1315.

Figure 25:
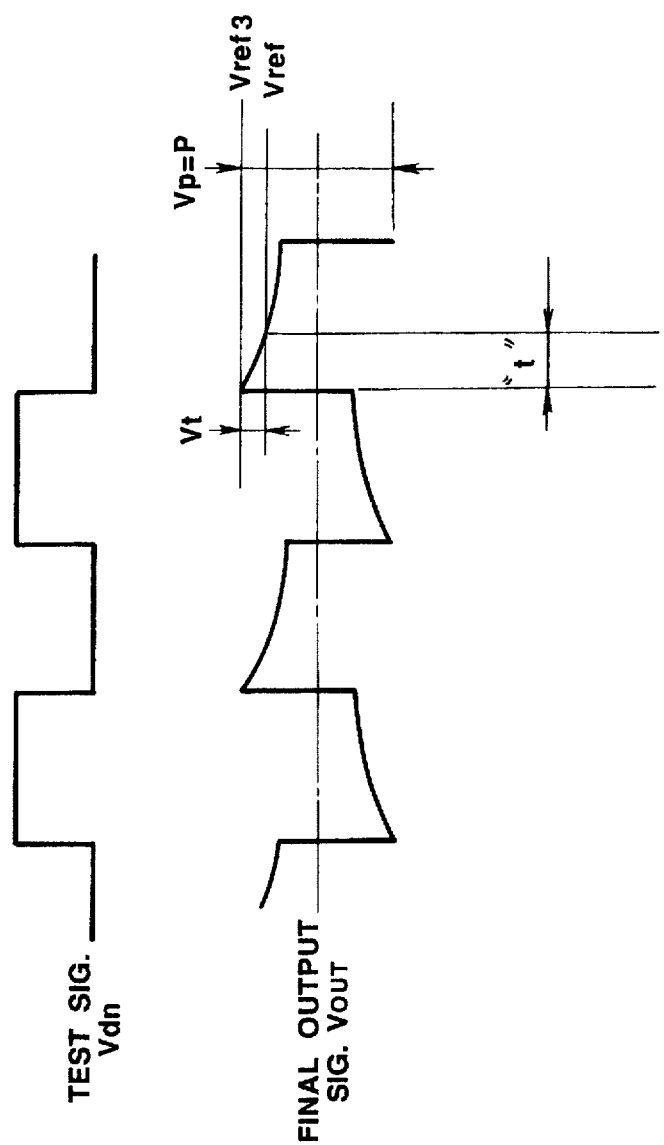
FIG. 25 is a chart which shows wave forms of signals which are produced in the circuit arrangement shown in FIG. 24.

The power source of the diagnostic section 1312 is separate from that of the sensor section 1301 and is supplied in response to the closure of the non-illustrated illustrated main switch. Upon closure of the main switch and the supply of power to the diagnostic section 1312, a switch SW associated with the diagnostic signal generator 1313 is arranged to also undergo closure. With the switch SW in its closed (ON) state a pulse train (Vdn) having a wave form of the nature illustrated in the upper section of FIG. 25, is supplied to the base of the transistor 1304. The accelerometer sensor bridge 1302 and amplifier related first malfunction discrimination circuit 1314 includes a voltage peak separation detection circuit 1314a, a comparator 1314b which has a non-inverting terminal supplied with a predetermined reference voltage Vref2 by a potentiometer 1314c.

The first malfunction discrimination circuit 1314 is arranged so that the final voltage signal Vout of the secondary amplifier circuit 1309 is supplied to the voltage peak separation detection circuit 1314a. Further, the first malfunction discrimination circuit 1314 is arranged to determine the value Vp-p (see lower half of FIG. 25) between the voltage peaks of final output signal Vout signal and to compare the same with a predetermined reference voltage Vref2. In the event that the Vp-p voltage is lower than Vref2, a malfunction indicative H active malfunction signal is issued.

The second malfunction detection circuit 1315 which is capable of determining if the high pass filter circuit 1308 is malfunctioning, includes a comparator 1315a. The comparator 1315a is connected with a potentiometer 1315b which is arranged to output a predetermined reference voltage Rref3. The output of the comparator is coupled with one of the inputs of an AND gate 1315c. The other of the AND gate inputs is connected with an oscillator 15d which is arranged to output a pulse train having a predetermined frequency. The output of the AND is connected to a counter 1315e which is arranged to count up in response to the pulses which are transmitted through the AND gate while it is open, and a display which displays the count.

The output Vout of the secondary amplifier circuit 1309 is supplied to the non-inverting input of the comparator 1315a of second malfunction discrimination circuit 1315. During the time the Vout level is above Vref3, the AND gate 1315c is opened and the count which is displayed is representative of the time "''" indicated on the lower of the two traces shown in FIG. 25. This count is compared with ranges which are indicative of normal and abnormal operation and permit a decision as to the presence or absence of a malfunction.

When put into use, the above circuit arrangement is such that even though the sensor chip 1301 is not subject to an actual acceleration and the sensor elements are not subject to any strain, by closing the main switch and then closing switch SW, a signal in the form of the pulse train show in the upper half of FIG. 25 is applied to the base of the transistor 1304. This induces ON/OFF switching of the transistor 1304. While the transistor 1304 is conductive (ON), resistor 1303 is connected in parallel with the resistor 2d of the resistor bridge 1302 and causes the output of the resistor bridge to change from V1 to V2.

Given that the resistance of the sensor elements 2a, 2b, 2c and 2d are r1, r2, r3 and r4, respectively, then it can be shown that while transistor 1304 is ON:

$$\left( \frac{\frac{r4 \cdot R}{r4+R}}{r3 + \frac{r4 \cdot R}{r4+R}} - \frac{r2}{r1+r2} \right) \cdot V_{sup} \tag{9}$$

On the other hand, while transistor 1304 is OFF the situation becomes:

$$\left( \frac{r4}{r3+r4} - \frac{r2}{r2+r2} \right) \cdot V_{sup} \tag{10}$$

The output of the sensor 1301 which is changing back and forth between V1 and V2, is supplied to the primary amplification circuit 1307 and subsequently output to the high pass filter 1308 wherein the signal is subjected to filtering. The filter signal is then supplied to the secondary amplification circuit 1309 which amplifies the same and outputs the Vout signal having the wave form illustrated in FIG. 25.

It should be noted that the secondary amplification circuit 1309 exhibits an amplification ratio a and as such:

$$Vout = a(V1-V2) + Vref \tag{11}$$

This Vout signal is supplied to the first and second malfunction discrimination circuits 1314 and 1315. The first malfunction discrimination circuit 1314 is such as to determine the Vp-p value and compare the same with the Vref2 reference voltage. In the event that the Vp-p value is less than the Vref2 level, the H active malfunction signal is output from the comparator 1314b.

On the other hand, the second malfunction discrimination circuit 1315 is such as to compare the Vout value with the Vref3 level. While Vout>Vref3 the AND gate is opened and the pulse train from the oscillator 15d is supplied to the counter 15e. As pointed out above, the AND gate is only open for time "t" and as a result the count which is displayed is indicative of the same.

In the event that the high pass filter 1308 is malfunctioning, viz., if one of the condenser or the resistor have failed, the RC time constant of the device changes (i.e. either R or C changes) and the time "t" is effected. Therefore, if the count which is registered on the display 1315f is out of the acceptable range, it can be assumed that the fault lies in the high pass filter circuit 1308.

In this particular embodiment the balance of the sensor element 2d is disturbed by the application of the pulse train signal, however the same effect may be obtained in connection with any of the other three elements.

Further, the resistor 1303 is set so that Vp-p value of the Vout signal is selected will be in the order of that which should be produced by accelerations of 1~2 G. The reason for this is that, for any reason transistor 1304 should become shot, the effect on the operation of the resistor bridge 1302 will not be noticeable.

Thus, as will be appreciated, the above described arrangement is such that when the balance of the sensor bridge is disturbed by the use of a bridge unbalancing means, it is possible to monitor the output of the bridge and distinguish between a malfunction due to a failure of one of the resistors which makes up the resistor bridge or if the circuit which processes the bridge output is the cause of the problem. In the latter case, it is possible to determine the location of the failure.

Fourteenth Embodiment

Figure 28:
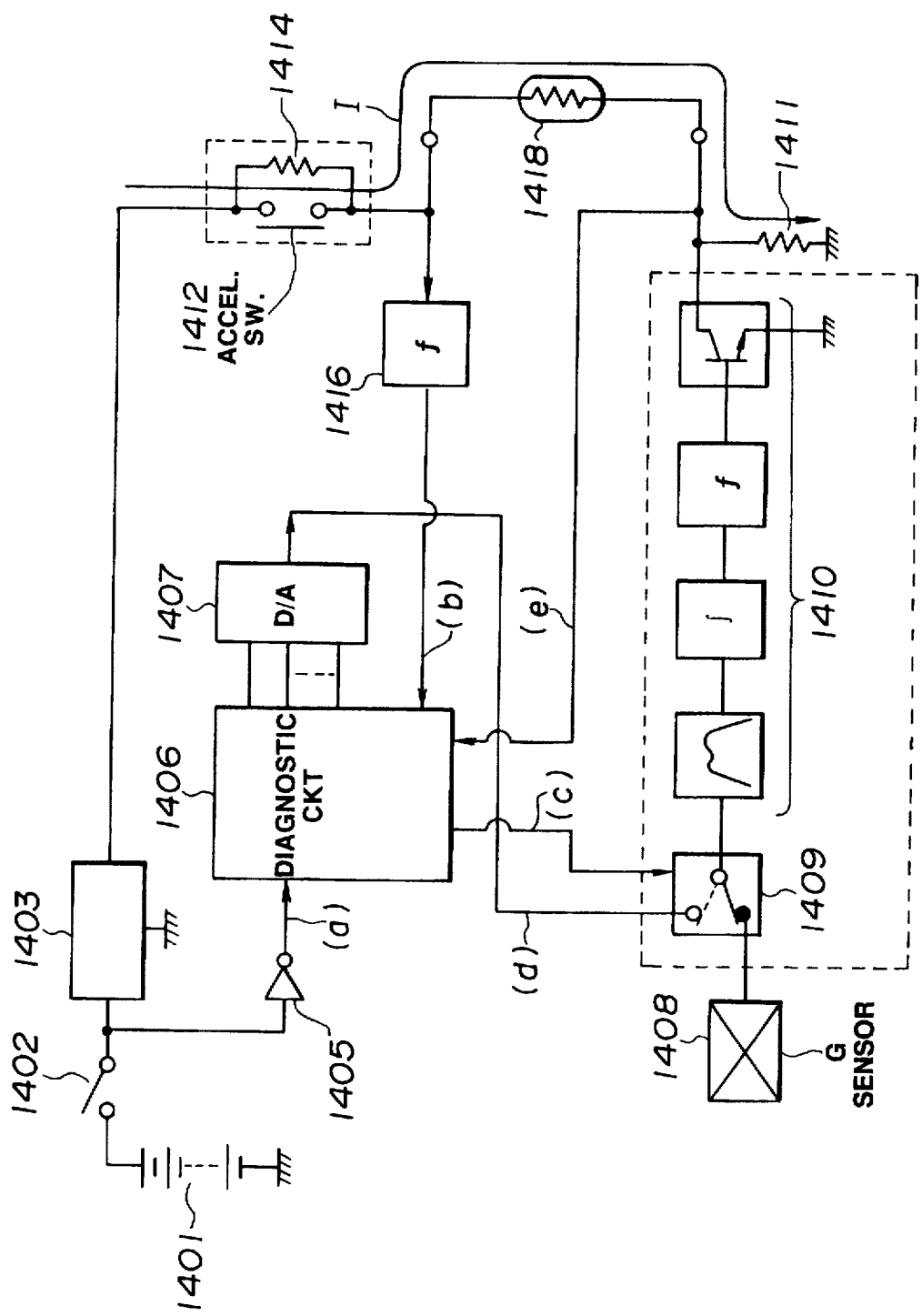
FIG. 28 is a circuit diagram showing a diagnostic arrangement which characterizes a fourteenth embodiment of the present invention.

FIG. 28 shows a diagnostic arrangement which can be applied to any of the above embodiments in order to determine if the circuit is fully operative or not at the time of engine start-up.

In the illustrated arrangement the numeral 1401 denotes battery or the like electrical power source; 1402 an ignition switch; 1403 a voltage step up arrangement for producing a very high voltage suitable for igniting the air-bag inflation charge; 1405 an ignition switch interface (in this instance an inverter circuit); 1406 a diagnostic circuit arrangement which includes a microprocessor; and a D/A converter 1407. Further, 1408 denotes an accelerometer (G sensor unit); 1409 denotes a switch which is responsive to a command issued by the diagnostic circuit 1406 and which can selectively disconnect the normal connection with the G sensor unit 1408 and establish a temporary diagnostic connection with the diagnostic circuit 1406; 1410 a circuit arrangement which can process the G sensor unit input and generate a signal in the event that inflation of the air-bag is necessary, and 1411 a resistor for use during diagnostic testing.

The numerals 1412 and 1414 denote an acceleration responsive switch (e.g. a mercury switch) which is arranged to close in response to a predetermined small acceleration, and a dummy resistor is arranged in parallel with the switch 1412. The numeral 1416 denotes a slice level switch which is arranged to output a signal to an input port of the diagnostic circuit upon the detection of a predetermined voltage at a terminal located between the acceleration switch and an ignition device 1418. The purpose of this switch is to ascertain if the switch 1412 is open and that diagnostic testing will not result in the ignition of the ignition device 1418.

The operation of this arrangement is such that, upon the ignition switch 1402 being closed (assuming an ON state) the signal (a) being produced by the interface circuit 1405 changes and informs the diagnostic circuit 1406 of the need to initiate the check program. In response to this the diagnostic circuit 1406 checks the level of signal (b) being produced by the slice level switch 1416. In the event that signal (b) is indicative of the acceleration switch 1416 being open then it is deemed safe to perform the diagnostic operation.

Next, the diagnostic circuit 1406 is induced to output a signal (c) which induces switch 1409 to disconnect the G sensor unit 1408 from the circuit arrangement 1410 and connect the latter with an output of the D/A converter 1407 via which a test signal (d) is output. Needless to say, this test signal (d) is designed to cause the circuit arrangement 1410 to output a signal indicative of the need to inflate the air-bag.

The diagnostic circuit 1406 is provided with a data input port which is connected with a junction defined between the point at which the test resistor 1411 is connected to the line leading from the switching transistor of the circuit arrangement 1410 to ignition device 1418. As will be appreciated, when the circuit arrangement 1410 outputs an inflation command signal, a predetermined voltage should develop at the above mentioned junction. In the event that signal (e) exhibits the required voltage level, the diagnostic circuit 1406 issues an indication that the circuit arrangement 1410 is functioning normally. On the other hand, if the voltage level does not exhibit the required magnitude, a malfunction indication is issued.

As will be appreciated, the above arrangement obviates the problem of having two different transistors achieve synchronous switching and further enables the operability of the circuit arrangement 1410 to be ascertained with a very high degree of certainty and without running the risk of accidentally inflating the air-bag.

It will be of course appreciated that the above described arrangement can be applied to any of the circuit arrangements disclosed in connection with the various embodiments of the present invention and is not limited to the arrangement illustrated in FIG. 28. Merely by way of example, it is possible to check all sections SEC.01, SEC.02 and SEC.03 of the arrangement shown in FIG. 1, individually and in a manner which would enable the point at which the malfunction could be tracked down. Viz., in the case of SEC.02 by selectively increasing the level of the test signal from 1.0 G–4.0 G–10.0 G and monitoring the output of a suitable element, it would be possible to determine if any one of the first, third and fourth comparators was possibly malfunctioning.

Although the above embodiments have been described as applied to air-bag safety systems, it will be understood that in particular, the concept on which the acceleration induced displacement prediction is based is not limited to the disclosed uses and may find application in a number of different situations. Merely by way of example, the circuit arrangement disclosed in connection with FIG. 8 could find highly beneficial application with suspension control systems wherein the prediction of vehicular movement during cornering, braking etc., has obvious benefit.

What is claimed is:

1. A control circuit for an air-bag mounted in a motor vehicle, comprising:

an acceleration sensor mounted to the vehicle for producing an acceleration signal a(t) indicative of acceleration of the vehicle;

an ignition timing circuit which processes said acceleration signal to predict a time when a passenger's head will reach a front surface of the air-bag in a fulls deployed condition and thereafter produces a timing-based ignition signal in accordance with the predicted time; and wherein said ignition timing circuit includes circuit means which is operatively connected to said acceleration sensor, said circuit means performing the following functions:

carrying out partial integration of the acceleration signal a(t) to produce a signal V(t) indicative of velocity;

carrying out partial integration of the velocity indicative signal V(t) to produce a first signal x(t) indicative of displacement;

weighting the acceleration signal a(t) with a factor $td^2/2$ to produce a second signal $\{½ \times a(t) \times td^2\}$ indicative of displacement;

weighting the velocity indicative signal V(t) with a time factor (td) to produce a third signal $\{V(t) \times td\}$ indicative of displacement;

adding the first, second and third displacement signals together to derive a predicted displacement signal $\{x(t+td)\}$;

comparing the predicted displacement signal with a reference value; and issuing said timing-based ignition signal in the event that the predicted displacement signal exceeds the reference value.

2. A control circuit as claimed in claim 1, wherein said partial integration of the acceleration signal is achieved by utilization of a first-order lag integral of a form $T1/(T1S+1)$, where T1 is a constant and S is a Laplace operator, and wherein said partial integration of the velocity indicative signal is achieved by utilization of the first-order lag integral of a form $T2/(T2S+1)$, where T2 is a constant and S is the Laplace operator.

3. A control circuit for an air-bag mounted in a motor vehicle, comprising:

an acceleration sensor for producing an acceleration signal indicative of acceleration of the vehicle;

an ignition timing circuit which processes said acceleration signal to predict a position of a passenger's head which will be taken after a given period from a given time and thereafter produces a timing-based ignition signal in accordance with the predicted position of the passenger's head; and an activation circuit which activates said air-bag in accordance with said timing-based ignition signal, wherein said ignition timing circuit is operatively connected to said acceleration sensor for calculating the predicted position by using a prediction equation which includes partial integration.

4. A control circuit as claimed in claim 3, in which said partial integration is performed by utilization of the first-order lag integral of a form T/(TS+1), wherein T is a constant and S is the Laplace operator.

5. A control circuit as claimed in claim 4, in which said prediction equation is represented by:

$$x(t+td)=\{x(t)\}+\{V(t) \times td\}+\{½ \times a(t) \times td^2\}$$

wherein:

x(t+td) is a predicted displacement,

{x(t)} is a displacement value obtained by effecting partial integration of a velocity which is obtained by effecting partial integration of said acceleration signal, {V(t)×td} is a displacement value obtained by weighting the velocity, and {½×a(t)×td²} is a displacement value obtained by weighting the acceleration, and wherein said prediction equation does not include a derivative value of said acceleration.

6. A control circuit as claimed in claim 5, further comprising a low pass filter through which said prediction circuit is connected to said acceleration sensor.

7. A control circuit as claimed in claim 4, further comprising a G-level discrimination circuit which judges the level of acceleration sensed by said acceleration sensor and controls said ignition timing circuit in accordance with said level of acceleration.

8. A control circuit as claimed in claim 7, further comprising a switch which is disposed between said low pass filter and said ignition timing circuit, said switch being turned ON when the G-level discrimination circuit judges that said level of acceleration exceeds a predetermined reference value.

9. A control circuit as claimed in claim 8, in which said G-level discrimination circuit comprises:

a plurality of comparators, each comparator comparing the level of the sensed acceleration with a reference level; and timer means which issues a reset signal to turn OFF said switch upon expiration of a set time, wherein when the level of the sensed acceleration exceeds a predetermined reference level, said timer means starts to count the set time.

10. A control circuit as claimed in claim 4, further comprising:

a damage discrimination circuit which processes said acceleration signal and judges a need of activation of the air-bag when a cumulative effect of the acceleration exceeds a predetermined limit, said damage discrimination circuit producing a damage-based ignition signal when judging the need of activation of said air-bag; and an AND gate circuit for activating said air-bag when receiving said timing-based and damage-based ignition signals concurrently.

11. A control circuit as claimed in claim 10, further comprising resetting means for resetting said damage discrimination circuit upon receiving a given instruction signal from a G-level discrimination circuit which judges the level of acceleration sensed by said acceleration sensor and controls said ignition timing circuit in accordance with said level of acceleration.

12. A control circuit as claimed in claim 10, further comprising a G-level discrimination circuit which judges when the level of acceleration exceeds a maximum reference value; and an OR gate circuit which issues an instruction signal to said AND gate circuit when said G-level discrimination circuit judges that the level of acceleration exceeds the maximum reference value or said damage discrimination circuit judges the need of activation of the air-bag.

13. A control circuit as claimed in claim 4, further comprising:

brake operation sensing means which issues a brake operation signal when a brake pedal of the vehicle has been depressed; and control means which controls said timing-based ignition signal to be issued at a relatively slow timing when receiving said brake operation signal.

14. A control circuit as claimed in claim 13, further comprising:

a comparator circuit provided in said ignition timing circuit, said comparator circuit comparing said timing-based ignition signal with a reference value which corresponds to said predetermined degree, said comparator circuit issuing a comparator signal for controlling said reference value; and a reference value controlling circuit which changes the reference value of said comparator circuit depending on whether the brake pedal is depressed or not.

15. A control circuit for an air-bag mounted in a motor vehicle comprising:

an acceleration sensor mounted on the vehicle for producing an acceleration signal indicative of acceleration of the vehicle;

an ignition-timing circuit which calculates a predicted displacement {x(t+td) } of a -passenger's head by integrating said acceleration signal and issues a timing-based ignition signal when the predicted displacement {x(t+td) } reaches a predetermined degree (X) representing a time when the passenger's head will reach a front surface of the air-bag in a fully deployed condition;

a damage discrimination circuit which processes said acceleration signal to issue a damage-based ignition signal when a cumulative effect of said acceleration exceeds a predetermined limit, said damage-based ignition signal being issued Prior to said timing-based ignition signal;

a date circuit which activates the air-bag with a timing decided by said timing-based ignition signal only when said damage discrimination circuit issues said damage-based ignition signal deciding the activation of the air-bag and said ignition timing circuit issues said timing-based ignition signal deciding the activation of the air-bag the ignition timing circuit performing the calculation of the displacement concurrently with the damage discrimination circuit determining whether or not to issue the damage-based ignition signal;

a G-level discrimination circuit which judges the level of acceleration sensed by said acceleration sensor and controls said ignition timing circuit in accordance with said level of acceleration;

a low pass filter through which said ignition timing circuit is connected to said acceleration sensor; and switch means which is disposed between said low pass filter and said ignition timing circuit, said switch means being turned ON when the G-level discrimination circuit judges that said level of acceleration exceeds a predetermined reference level.

16. A control circuit as claimed in claim 15, further comprising resetting means for resetting said damage discriminating circuit upon receiving a given instruction signal from said G-level discrimination circuit.

17. A control circuit as claimed in claim 15, wherein said G-level discrimination circuit comprises:

a plurality of comparators, each comparator comparing the level of the sensed acceleration with a reference level; and timer means which issues a reset signal to turn OFF said switch means upon expiration of a set time, wherein, when the level of the sensed acceleration exceeds a predetermined reference level, said timer means starts to count the set time.

18. A control circuit as claimed in claim 15, further comprising:

seat position detecting means issuing a seat position signal indicative of a fore-and-aft position of a seat mounted in the vehicle; and control means which, in accordance with said seat position signal, controls said timing-based ignition signal in such a manner that when said seat assumes a relatively front position, said timing-based ignition signal is issued at a relatively fast timing, and when said seat assumes a relatively rear position, said timing-based ignition signal is issued at a relatively slow timing.

19. A control circuit as claimed in claim 18, further comprising a comparator circuit possessed by said ignition timing circuit, said comparator circuit comparing said timing-based ignition signal with a reference value which corresponds to said predetermined degree, said comparator circuit issuing a comparator signal to control said reference value, said reference value of the comparator circuit being controlled by said control means in such a manner that when said seat assumes the relatively front position, said reference value is lowered, and when said seat assumes the relatively rear position, said reference value is increased.

20. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement $\{x(t+td)\}$ of a passenger's head by carrying out partial integration of said acceleration signal and issues a timing-based ignition signal when the displacement $\{x(t)+td)\}$ reaches a predetermined decree (X) representing a time when the passenger's head will reach a front surface of the air-bag in a fully deployed condition;

a damage discrimination circuit which processes said acceleration signal to issue a damage-based ignition signal when a cumulative effect of said acceleration exceeds a predetermined limit, said damage-based ignition signal being issued prior to said timing-based ignition signal; and gate means for activating the air-bag with a timing decided by said timing-based ignition signal only when said damage discrimination circuit issues said damage-based ignition signal deciding the activation of the air-bag and said ignition timing circuit issues said timing-based ignition signal deciding the activation of the air-bag, wherein the ignition timing circuit performs the calculation of the displacement concurrently with the damage discrimination circuit determining whether or not issue the damage-based ignition signal, and wherein said ignition timing circuit comprises integrating circuit means, coefficient circuit means, and ADDER circuit means.

21. A control circuit as claimed in claim 20, further comprising a comparator circuit which receives output from said ADDER circuit means, said comparator judging the predicted position of the passenger's head when the output from said ADDER circuit means exceeds a predetermined level.

22. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement $\{x(t+td)\}$ of a passenger's head by integrating said acceleration signal without effecting a differentiation of the same and issues a timing-based ignition signal when the predicted displacement $\{x(t+td)\}$ reaches a predetermined degree (X) representing a time when the passenger's head will reach a front surface of the air-bag in a fully deployed condition;

a damage discrimination circuit which processes said acceleration signal to issue a damage-based ignition signal when a cumulative effect of said acceleration exceeds a predetermined limit, said damage-based ignition signal being issued prior to said timing-based ignition signal;

gate means for activating the air-bag with a timing decided by said timing-based ignition signal only when said damage discrimination circuit issues said damage-based ignition signal deciding the activation of the air-bag, and said ignition timing circuit issues said timing-based ignition signal deciding the activation of the air-bag, the ignition timing circuit performing the calculation of the displacement concurrently with the damage discrimination circuit determining whether or not to issue the damage-based ignition signal;

brake operation means which issues a brake operation signal when a brake pedal of the vehicle has been depressed;

control means which controls said timing-based ignition signal to be issued at a relatively slow or delayed timing when receiving said brake operation signal;

a comparator circuit provided in said ignition timing circuit, said comparator circuit comparing said timing-based ignition signal with a reference value which corresponds to said predetermined degree, said comparator circuit issuing a comparator signal for controlling said reference value;

a reference value controlling circuit which chances the reference value of said comparator circuit depending on whether the brake pedal is depressed or not, wherein said reference value controlling circuit comprises:

first and second resistors which are arranged in series between an electric power line and ground;

a series circuit including a first switching transistor and a third resistor which is arranged in parallel with said first resistor; and a second switching transistor which is turned ON upon depression of said brake pedal thereby turning said first switching transistor ON, and in which a potential at a junction point between said first and second resistors is used as the reference value of said comparator circuit.

23. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement $\{x(t+td)\}$ of a passenger's head by integrating said acceleration signal without effecting a differentiation of the same and issues a timing-based ignition signal when the predicted displacement $\{x(t+td)\}$ reaches a Predetermined degree (X) representing a time when the passenger's head will reach a front surface of the air-bag in a fully deployed condition:

a damage discrimination circuit which processes said acceleration signal to issue a damage-based ignition signal when a cumulative effect of said acceleration exceeds a predetermined limit, said damage-based ignition signal being issued prior to said timing-based ignition signal;

gate means for activating air-bag with a timing decided by said timing-based ignition signal only when said damage discrimination circuit issues said damage-based ignition signal deciding the activation of the air-bag and said ignition timing circuit issues said timing-based ignition signal deciding the activation of the air-bag, the ignition timing circuit performing the calculation of the displacement concurrently with the damage discrimination circuit determining whether or not to issue the damage-based ignition signal;

seatback inclination angle detecting means which issues an inclination angle signal indicative of an inclination angle assumed by a seatback of a reclining seat mounted on the vehicle; and control means which, in accordance with said inclination angle signal, controls said timing-based ignition signal in such a manner that when said inclination angle is smaller than a first predetermined inclination angle, said timing-based ignition signal is issued at a first timing, and when said inclination angle is larger than a second predetermined inclination angle, said timing-based ignition signal is issued at a second timing.

24. A control circuit as claimed in claim 23, further comprising a comparator circuit provided in said ignition timing circuit, said comparator circuit comparing said timing-based ignition signal with a reference value which corresponds to said predetermined degree, said comparator circuit issuing a comparator signal to control said reference value, said reference value of the comparator circuit being controlled by said control means in such a manner that when the inclination angle is smaller than the first predetermined inclination angle, said reference value is lowered, and when said inclination angle is larger than the second predetermined inclination angle, said reference value is increased.

25. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement $\{x(t+td)\}$ of a passenger's head by integrating said acceleration signal without effecting a differentiation of the same and issues a timing-based ignition signal when the predicted displacement $\{x(t+td)\}$ reaches a predetermined decree (X) representing a time when the passenger's head will reach a front surface of the air-bag in a fully deployed condition;

a damage discrimination circuit which processes said acceleration signal to issue a damage-based ignition signal when a cumulative effect of said acceleration exceeds a predetermined limit, said damage-based ignition signal being issued prior to said timing-based ignition signal;

gate means for activating air-bag with a timing decided by said timing-based ignition signal only when said damage discrimination circuit issues said damage-based ignition signal deciding the activation of the air-bag and said ignition timing circuit issues said timing-based ignition signal deciding the activation of the air-bag, the ignition timing circuit performing the calculation of the displacement concurrently with the damage discrimination circuit determining whether or not to issue the damage-based ignition signal;

a seatbelt drawing degree detecting means which issues a belt drawing degree signal indicative of a degree by which a seatbelt is drawn from a seatbelt retracting shaft of a seatbelt retractor mounted in the vehicle; and control means which, in accordance with said belt drawing degree signal, controls said timing-based ignition signal in such a manner that when the seatbelt is retracted by said seatbelt retracting shaft by a relatively small degree, said timing-based ignition signal is issued at a relatively fast timing, and when said seatbelt is retracted by said retracting shaft by a relatively large degree, said timing-based ignition signal is issued at a relatively slow timing.

26. A control circuit as claimed in claim 25, wherein said ignition timing circuit further comprises a comparator circuit, said comparator circuit comparing said timing-based ignition signal with a reference value which corresponds to said predetermined degree, said comparator circuit issuing a comparator signal to control said reference value.

27. A control circuit as claimed in claim 26, wherein said seatbelt drawing degree detecting means comprises a variable resistor which changes the reference value of the comparator circuit when actuated, a resistance of said variable resistor being varied in accordance with the length of the seatbelt which is drawn out from said seatbelt retracting shaft, and wherein said seatbelt drawing degree detecting means has two blind zones within which the resistance value of the variable resistor is kept constant even when the seatbelt is drawn out from said seatbelt retracting shaft.

28. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement {x(t+td)} of a passenger's head by integrating said acceleration signal and issues a timing-based ignition signal when the predicted displacement {x(t+td)} reaches a predetermined degree (X) representing a time when the passenger's head will reach a front surface of the air-bag in a fully deployed condition;

a damage discrimination circuit which processes said acceleration signal to issue a damage-based ignition signal when a cumulative effect of said acceleration exceeds a predetermined limit, said damage-based ignition signal being issued prior to said timing-based ignition signal; and gate means for activating the air-bag with a timing decided by said timing-based ignition signal only when said damage discrimination circuit issues said damage-based ignition signal deciding the activation of the air-bag and said ignition timing circuit issues said timing-based ignition signal deciding the activation of the air-bag, wherein the ignition timing circuit performs the calculation of the displacement concurrently with the damage discrimination circuit determining whether or not to issue the damage-based ignition signal, and wherein said ignition timing circuit includes circuit means which is operatively connected to said acceleration sensor, said circuit means performing the following functions:

integrating the acceleration signal a(t) to produce a signal V(t) indicative of velocity;

integrating the velocity indicative signal V(t) to produce a first signal x(t) indicative of displacement;

weighting the acceleration indicative signal a(t) with a factor ($t^2d/2$ to produce a second signal {½×a(t)×$t^2d$} indicative of displacement; and adding the first, second and third displacement signals together to derive a predicted displacement signal {x(t +td)}, wherein the integrating of the acceleration signal a(t) is performed by a first partial integration by utilization of a first-order lag integral of a form T1/(T1S+1), where T1 is a constant and S is a Laplace operator, and wherein the integrating of the velocity indicative signal V(t) is performed by a second partial integration by utilization of the first-order lag integral of a form T2/(T2S+1), where T2 is a constant and S is the Laplace operator.

29. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement {x(t+td)} of a passenger's head by integrating said acceleration signal without effecting a differentiation of said acceleration signal and issues a timing-based ignition signal when the predicted displacement {x(t+td)} reaches a predetermined degree (X) representing a time when the passenger's head will reach a front surface of the air-bag in a fully deployed condition;

a damage discrimination circuit which processes said acceleration signal to issue a damage-based ignition signal when a cumulative effect of said acceleration exceeds a predetermined limit, said damage-based ignition signal being issued prior to said timing-based ignition signal; and a gate circuit which activates the air-bag with a timing decided by said timing-based ignition signal only when said damage discrimination circuit issues said damage-based ignition signal deciding the activation of the air-bag, and said ignition timing circuit issues said timing-based ignition signal deciding the activation of the air-bag, the ignition timing circuit performing the calculation of the displacement concurrently with the damage discrimination circuit determining whether or not to issue the damage-based ignition signal, a brake operation circuit which issues a brake operation signal when a brake pedal of the vehicle has been depressed;

a control circuit which controls said timing-based ignition signal to be issued at a relatively slow or delayed timing when receiving said brake operation signal;

a comparator circuit provided in said ignition timing circuit, said comparator circuit comparing said timing-based ignition signal with a reference value which corresponds to said predetermined degree, said comparator circuit issuing a comparator signal for controlling said reference value;

a reference value controlling circuit which changes the reference value of said comparator circuit depending on whether the brake pedal is depressed or not, wherein said reference value controlling circuit comprises:

first and second resistors which are arranged in series between an electric power line and ground;

a series circuit including a first switching transistor and a third resistor which is arranged in parallel with said first resistor; and a second switching transistor which is turned ON upon depression of said brake pedal thereby turning said first switching transistor ON, and in which a potential at a junction point between said first and second resistors is used as the reference value of said comparator circuit.

30. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement {x(t+td)} of a passenger's head by integrating said acceleration signal without effecting a differentiation of said acceleration signal and issues a timing-based ignition signal when the predicted displacement {x(t+td)} reaches a predetermined degree (X) representing a time when the passengers head will reach a front surface of the air-bag in a fully deployed condition;

a damage discrimination circuit which processes said acceleration signal to issue a damage-based ignition signal when a cumulative effect of said acceleration exceeds a predetermined limit, said damage-based ignition signal being issued prior to said timing-based ignition signal; and a gate circuit which activates air-bag with a timing decided by said timing-based ignition signal only when said damage discrimination circuit issues said damage-based ignition signal deciding the activation of the air-bag and said ignition timing circuit issues said timing-based ignition signal deciding the activation of the air-bag, the ignition timing circuit performing the calculation of the displacement concurrently with the damage discrimination circuit determining whether or not to issue the damage-based ignition signal;

a seatback inclination angle detecting circuit which issues an inclination angle signal indicative of an inclination angle assumed by a seatback of a reclining seat mounted on the vehicle; and a control circuit which, in accordance with said inclination angle signal, controls said timing-based ignition signal in such a manner that when said inclination angle is smaller than a first predetermined inclination angle, said timing-based ignition signal is issued at a first timing, and when said inclination angle is larger than a second predetermined inclination angle, said timing-based ignition signal is issued at a second timing.

31. A control circuit as claimed in claim 30, further comprising a comparator circuit provided in said ignition timing circuit, said comparator circuit comparing said timing-based ignition signal with a reference value which corresponds to said predetermined degree, said comparator circuit issuing a comparator signal to control said reference value, said reference value of the comparator circuit being controlled by said control circuit in such a manner that when the inclination angle is smaller than the first predetermined inclination angle, said reference value is lowered, and when said inclination angle is larger than the second predetermined inclination angle, said reference value is increased.

32. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement $\{x(t+td)\}$ of a passenger's head by integrating said acceleration signal without effecting a differentiation of said acceleration signal and issues a timing-based ignition signal when the predicted displacement $\{x(t+td)\}$ reaches a predetermined degree (X) representing a time when the passenger's head will reach a front surface of the air-bag in a fully deployed condition;

a damage discrimination circuit which issues a damage-based ignition signal when a cumulative effect of said acceleration exceeds a predetermined limit, said damage-based ignition signal being issued prior to said timing-based ignition signal;

a gate circuit which activates the air-bag with a timing decided by said timing-based ignition signal only when said damage discrimination circuit issues said damage-based ignition signal deciding the activation of the air-bag and said ignition timing circuit issues said timing-based ignition signal deciding the activation of the air-bag, the ignition timing circuit performing the calculation of the displacement concurrently with the damage discrimination circuit determining whether or not to issue the damage-based ignition signal;

a seatbelt drawing degree detecting circuit which issues a belt drawing degree signal indicative of a degree by which a seatbelt is drawn from a seatbelt retracting shaft of a seatbelt retractor mounted in the vehicle; and a control circuit which, in accordance with said belt drawing degree signal, controls said timing-based ignition signal in such a manner that when the seatbelt is retracted by said seatbelt retracting shaft by a relatively small degree, said timing-based ignition signal is issued at a relatively fast or advanced timing, and when said seatbelt is retracted by said retracting shaft by a relatively large degree, said timing-based ignition signal is issued at a relatively slow or delayed timing.

33. A control circuit as claimed in claim 32, wherein said ignition timing circuit further comprises a comparator circuit, said comparator circuit comparing said timing-based ignition signal with a reference value which corresponds to said predetermined degree, said comparator circuit issuing a comparator signal to control said reference value.

34. A control circuit as claimed in claim 33, wherein said seatbelt drawing degree detecting circuit comprises a variable resistor which changes the reference value of the comparator circuit when actuated, a resistance value of said variable resistor being varied in accordance with the length of the seatbelt which is drawn out from said seatbelt retracting shaft, and wherein said seatbelt drawing degree detecting circuit has two blind zones within which the resistance value of the variable resistor is kept constant even when the seatbelt is drawn out from said seatbelt retracting shaft.

35. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement $\{x(t+td)\}$ of a passengers head by effecting partial integration of said acceleration signal without effecting a differentiation of said acceleration signal and issues a timing-based ignition signal when the predicted displacement $\{x(t)+td)\}$ reaches a predetermined degree (X) representing a time when the passenger's head will reach a front surface of the air-bag in a fully deployed condition;

a brake operation circuit which issues a brake operation signal when a brake pedal of the vehicle has been depressed;

a control circuit which controls said timing-based ignition signal to be issued at a relatively slow or delayed timing when receiving said brake operation signal;

a comparator circuit provided in said ignition timing circuit, said comparator circuit comparing said timing-based ignition signal with a reference value which corresponds to said predetermined degree, said comparator circuit issuing a comparator signal for controlling said reference value; and a reference value controlling circuit which changes the reference value of said comparator circuit depending on whether the brake pedal is depressed or not, wherein said reference value controlling circuit comprises:

first and second resistors which are arranged in series between an electric power line and ground;

a series circuit including a first switching transistor and a third resistor which is arranged in parallel with said first resistor; and a second switching transistor which is turned ON upon depression of said brake pedal thereby turning said first switching transistor ON, and in which a potential at a junction point between said first and second resistors is used as the reference value of said comparator circuit.

36. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement {x(t+td)} of a passenger's head by effecting partial integration of said acceleration signal without effecting a differentiation of said acceleration signal and issues a timing-based ignition signal when the displacement {x(t+td)} reaches a predetermined degree (X) representing a time when the passenger's head will reach a front surface of the air-bag in a fully deployed condition;

a seatback inclination angle detecting circuit which issues an inclination angle signal indicative of an inclination angle assumed by a seatback of a reclining seat mounted on the vehicle; and a control circuit which, in accordance with said inclination angle signal, controls said timing-based ignition signal in such a manner that when said inclination angle is smaller than a first predetermined inclination angle, said timing-based ignition signal is issued at a first timing, and when said inclination angle is larger than a second predetermined inclination angle, said timing-based ignition signal is issued at a second timing.

37. A control circuit for an air-bag mounted in a motor vehicle, comprising:

an acceleration sensor mounted on the vehicle for producing an acceleration signal indicative of acceleration of the vehicle;

an ignition timing circuit which calculates a predicted displacement {x(t+td)} of a passenger's head by effecting partial integration of said acceleration signal without effecting a differentiation of said acceleration signal and issues a timing-based ignition signal when the displacement {x(t+td)} reaches a predetermined degree (X) representing a time when the passenger's head will reach a front surface of the air-bag in a fully deployed condition;

a seatbelt drawing degree detecting circuit which issues a belt drawing degree signal indicative of a degree by which a seatbelt is drawn from a seatbelt retracting shaft of a seatbelt retractor mounted in the vehicle; and a control circuit which, in accordance with said belt drawing degree signal, controls said timing-based ignition signal in such a manner that when the seatbelt is retracted by said seatbelt retracting shaft by a relatively small degree, said timing-based ignition signal is issued at a relatively fast or advanced timing, and when said seatbelt is retracted by said retracting shaft by a relatively large degree, said timing-based ignition signal is issued at a relatively slow or delayed timing.

* * * * *